(12) United States Patent
Emura et al.

(10) Patent No.: US 10,625,820 B2
(45) Date of Patent: Apr. 21, 2020

(54) BICYCLE REAR SPROCKET ASSEMBLY

(71) Applicant: SHIMANO INC., Sakai (JP)

(72) Inventors: Atsuhiro Emura, Sakai (JP); Hiroshi Fujita, Sakai (JP); Fumiaki Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 184 days.

(21) Appl. No.: 15/879,353

(22) Filed: Jan. 24, 2018

(65) Prior Publication Data
US 2019/0225302 A1    Jul. 25, 2019

(51) Int. Cl.
  *B62M 9/12*   (2006.01)
  *F16H 55/12*  (2006.01)
  *F16H 55/06*  (2006.01)
  *F16H 55/30*  (2006.01)
  *B62M 9/10*   (2006.01)

(52) U.S. Cl.
CPC ............... *B62M 9/12* (2013.01); *B62M 9/10* (2013.01); *F16H 55/06* (2013.01); *F16H 55/12* (2013.01); *F16H 55/30* (2013.01)

(58) Field of Classification Search
CPC .......... B62M 9/10; B62M 9/12; B62M 9/121; F16H 55/30; F16H 55/303
USPC ....................................................... 474/160
See application file for complete search history.

(56) References Cited

U.S. PATENT DOCUMENTS

| | | | |
|---|---|---|---|
| 5,935,034 A * | 8/1999 | Campagnolo | B62M 9/10 474/160 |
| 6,024,662 A * | 2/2000 | Fujimoto | B62M 3/003 280/261 |
| 6,176,798 B1 * | 1/2001 | Nakamura | B62M 9/10 474/160 |
| 6,428,437 B1 * | 8/2002 | Schlanger | B62M 9/10 474/160 |
| 7,344,463 B2 * | 3/2008 | Reiter | B62M 9/10 474/160 |
| 7,871,347 B2 * | 1/2011 | Kamada | B62M 9/10 474/152 |
| 8,696,503 B2 * | 4/2014 | Oishi | B62M 9/10 474/160 |
| 8,764,594 B2 * | 7/2014 | Dal Pra' | F16H 55/30 474/160 |
| 8,821,330 B2 * | 9/2014 | Dal Pra' | B62M 9/10 474/160 |

(Continued)

FOREIGN PATENT DOCUMENTS

CN    106184594    12/2016

*Primary Examiner* — Henry Y Liu
(74) *Attorney, Agent, or Firm* — Mori & Ward, LLP

(57) ABSTRACT

A bicycle rear sprocket assembly comprises a plurality of sprockets and a sprocket carrier. The plurality of sprockets includes a first sprocket and a second sprocket. The first sprocket has at least one circumferential coupling point. The first sprocket is coupled to a radially extending surface of at least one of a plurality of sprocket mounting portions at the at least one circumferential coupling point. The second sprocket has at least one additional circumferential coupling point. The second sprocket is coupled, at the at least one additional circumferential coupling point, to at least one of the sprocket carrier and one of the plurality of sprockets. A total number of the at least one circumferential coupling point is different from a total number of the at least one additional circumferential coupling point.

26 Claims, 25 Drawing Sheets

(56) References Cited

U.S. PATENT DOCUMENTS

| | | | | |
|---|---|---|---|---|
| 8,905,878 B2* | 12/2014 | Loy | B62M 9/10 | |
| | | | 474/160 | |
| 8,968,130 B2* | 3/2015 | Liao | B62M 9/10 | |
| | | | 474/160 | |
| 9,308,967 B2* | 4/2016 | Braedt | F16H 55/303 | |
| 9,415,835 B2* | 8/2016 | Tokuyama | B62M 9/12 | |
| 9,446,815 B2* | 9/2016 | Lin | F16H 55/30 | |
| 9,511,819 B1* | 12/2016 | Watarai | F16H 55/30 | |
| 9,550,547 B2* | 1/2017 | Valle | B62M 9/10 | |
| 9,868,491 B1* | 1/2018 | Oishi | B62M 9/12 | |
| 9,994,285 B2* | 6/2018 | Tokuyama | F16H 55/30 | |
| 10,112,681 B2* | 10/2018 | Oishi | B62M 9/10 | |
| 10,407,126 B2* | 9/2019 | Tokuyama | B62M 9/10 | |
| 2007/0049436 A1* | 3/2007 | Kannada | B62M 9/10 | |
| | | | 474/152 | |
| 2008/0004143 A1* | 1/2008 | Kanehisa | B62M 9/10 | |
| | | | 474/160 | |
| 2009/0042681 A1* | 2/2009 | Dal Pra' | B62M 9/10 | |
| | | | 474/160 | |
| 2009/0042682 A1* | 2/2009 | Dal Pra' | F16H 55/30 | |
| | | | 474/160 | |
| 2011/0105263 A1* | 5/2011 | Braedt | F16H 55/303 | |
| | | | 474/160 | |
| 2012/0225745 A1* | 9/2012 | Oishi | B62M 9/10 | |
| | | | 474/160 | |
| 2015/0024884 A1* | 1/2015 | Braedt | B62M 9/10 | |
| | | | 474/78 | |
| 2016/0083045 A1* | 3/2016 | Lin | B62M 9/10 | |
| | | | 474/160 | |
| 2016/0114859 A1* | 4/2016 | Tsai | B62M 9/10 | |
| | | | 474/160 | |
| 2016/0347410 A1* | 12/2016 | Watarai | F16H 55/30 | |
| 2017/0043840 A1* | 2/2017 | Reinbold | B62M 9/10 | |
| 2017/0361901 A1* | 12/2017 | Tokuyama | F16H 55/566 | |
| 2018/0022415 A1* | 1/2018 | Oishi | B62M 9/10 | |
| | | | 474/160 | |

* cited by examiner

BICYCLE REAR SPROCKET ASSEMBLY

BACKGROUND OF THE INVENTION

Field of the Invention

The present invention relates to a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle rear sprocket assembly comprises a plurality of sprockets and a sprocket carrier. The plurality of sprockets includes a first sprocket and a second sprocket. The sprocket carrier includes a plurality of sprocket mounting portions. At least one of the plurality of sprocket mounting portions has a radially extending surface and an axially extending surface. The radially extending surface extends radially with respect to a rotational center axis of the bicycle rear sprocket assembly. The axially extending surface extends axially from the radially extending surface with respect to the rotational center axis. The first sprocket has at least one circumferential coupling point. The first sprocket is coupled to the radially extending surface of at least one of the plurality of sprocket mounting portions at the at least one circumferential coupling point. The second sprocket has at least one additional circumferential coupling point. The second sprocket is coupled, at the at least one additional circumferential coupling point, to at least one of the sprocket carrier and one of the plurality of sprockets. A total number of the at least one circumferential coupling point being different from a total number of the at least one additional circumferential coupling point.

With the bicycle rear sprocket assembly according to the first aspect, it is possible to save a weight of the bicycle rear sprocket assembly while improving a balance of rigidity of the bicycle rear sprocket assembly.

In accordance with a second aspect of the present invention, the bicycle rear sprocket assembly according to the first aspect is configured so that the total number of the at least one additional circumferential coupling point is larger than the total number of the at least one circumferential coupling point.

With the bicycle rear sprocket assembly according to the second aspect, it is possible to save the weight of the bicycle rear sprocket assembly while further improving the balance of rigidity of the bicycle rear sprocket assembly.

In accordance with a third aspect of the present invention, the bicycle rear sprocket assembly according to the first or to the second aspect is configured so that the first sprocket has a maximum tooth bottom diameter. The second sprocket has an additional maximum tooth bottom diameter that is larger than the maximum tooth bottom diameter of the first sprocket.

With the bicycle rear sprocket assembly according to the third aspect, it is possible to save the weight of the bicycle rear sprocket assembly while improving the balance of rigidity of the bicycle rear sprocket assembly on a side of a larger sprocket.

In accordance with a fourth aspect of the present invention, the bicycle rear sprocket assembly according to any one of the first to third aspects is configured so that the plurality of sprocket mounting portions each has the radially extending surface extending radially with respect to the rotational center axis, and the axially extending surface extending axially from the radially extending surface with respect to the rotational center axis.

With the bicycle rear sprocket assembly according to the fourth aspect, it is possible to save the weight of the bicycle rear sprocket assembly while further improving the balance of rigidity of the bicycle rear sprocket assembly.

In accordance with a fifth aspect of the present invention, the bicycle rear sprocket assembly according to any one of the first to fourth aspects further comprises at least one fastening member. The first sprocket is coupled to the radially extending surface of the at least one of the plurality of sprocket mounting portions at the at least one circumferential coupling point with the at least one fastening member.

With the bicycle rear sprocket assembly according to the fifth aspect, it is possible to further improve the rigidity of the bicycle rear sprocket assembly.

In accordance with a sixth aspect of the present invention, the bicycle rear sprocket assembly according to any one of the first to fifth aspects further comprises a plurality of fastening members. The at least one circumferential coupling point includes a plurality of circumferential coupling points. The first sprocket is coupled to the radially extending surface of the at least one of the plurality of sprocket mounting portions at the plurality of circumferential coupling points with the plurality of fastening members.

With the bicycle rear sprocket assembly according to the sixth aspect, it is possible to further improve the rigidity of the bicycle rear sprocket assembly.

In accordance with a seventh aspect of the present invention, the bicycle rear sprocket assembly according to any one of the first to sixth aspects is configured so that the second sprocket is coupled to the one of the plurality of sprockets at the at least one additional circumferential coupling point.

With the bicycle rear sprocket assembly according to the seventh aspect, it is possible to further save the weight of the bicycle rear sprocket assembly.

In accordance with an eighth aspect of the present invention, the bicycle rear sprocket assembly according to the seventh aspect further comprises at least one fastening member. The second sprocket is coupled to the one of the plurality of sprockets at the at least one additional circumferential coupling point with the at least one fastening member.

With the bicycle rear sprocket assembly according to the eighth aspect, it is possible to further save the weight of the bicycle rear sprocket assembly.

In accordance with a ninth aspect of the present invention, the bicycle rear sprocket assembly according to the seventh aspect further comprises a plurality of fastening members. The at least one additional circumferential coupling point includes a plurality of additional circumferential coupling points. The second sprocket is coupled to the one of the plurality of sprockets at the plurality of additional circumferential coupling points with the plurality of fastening members.

With the bicycle rear sprocket assembly according to the ninth aspect, it is possible to further save the weight of the bicycle rear sprocket assembly. It is also possible to improve the rigidity of the bicycle rear sprocket assembly.

In accordance with a tenth aspect of the present invention, the bicycle rear sprocket assembly according to any one of the first to sixth aspects is configured so that the second sprocket is coupled to the sprocket carrier at the at least one additional circumferential coupling point.

With the bicycle rear sprocket assembly according to the tenth aspect, it is possible to further improve the rigidity of the bicycle rear sprocket assembly.

In accordance with an eleventh aspect of the present invention, the bicycle rear sprocket assembly according to the tenth aspect further comprises at least one fastening member. The second sprocket is coupled to the sprocket carrier at the at least one additional circumferential coupling point with the at least one fastening member.

With the bicycle rear sprocket assembly according to the eleventh aspect, it is possible to further improve the rigidity of the bicycle rear sprocket assembly.

In accordance with a twelfth aspect of the present invention, the bicycle rear sprocket assembly according to the tenth aspect further comprises a plurality of fastening members. The at least one additional circumferential coupling point includes a plurality of additional circumferential coupling points. The second sprocket is coupled to the sprocket carrier at the plurality of additional circumferential coupling points with the plurality of fastening members.

With the bicycle rear sprocket assembly according to the twelfth aspect, it is possible to further improve the rigidity of the bicycle rear sprocket assembly.

In accordance with a thirteenth aspect of the present invention, the bicycle rear sprocket assembly according to any one of the first to twelfth aspects is configured so that the sprocket carrier includes a central portion and a plurality of sprocket mounting arms extends radially outwardly from the central portion with respect to the rotational center axis. The plurality of sprocket mounting portions is respectively provided to the plurality of sprocket mounting arms. The total number of the plurality of additional circumferential coupling points is larger than a total number of the plurality of sprocket mounting portions.

With the bicycle rear sprocket assembly according to the thirteenth aspect, it is possible to save the weight of the bicycle rear sprocket assembly while further improving the balance of rigidity of the bicycle rear sprocket assembly.

In accordance with a fourteenth aspect of the present invention, the bicycle rear sprocket assembly according to the thirteenth aspect is configured so that the central portion of the sprocket carrier has a hub engagement profile.

With the bicycle rear sprocket assembly according to the fourteenth aspect, it is possible to effectively transmit a driving force to a wheel.

In accordance with a fifteenth aspect of the present invention, the bicycle rear sprocket assembly according to any one of the first to fourteenth aspects is configured so that the plurality of sprockets further includes a third sprocket and a fourth sprocket.

With the bicycle rear sprocket assembly according to the fifteenth aspect, it is possible to save the weight of the bicycle rear sprocket assembly while further improving the balance of rigidity of the bicycle rear sprocket assembly in a multiple rear sprocket assembly.

In accordance with a sixteenth aspect of the present invention, the bicycle rear sprocket assembly according to any one of the first to fifteenth aspects is configured so that the first sprocket is made of titanium.

With the bicycle rear sprocket assembly according to the sixteenth aspect, it is possible to save the weight of the bicycle rear sprocket assembly while further improving the balance of rigidity of the bicycle rear sprocket assembly.

In accordance with a seventeenth aspect of the present invention, the bicycle rear sprocket assembly according to any one of the first to sixteenth aspect is configured so that the second sprocket is made of aluminum.

With the bicycle rear sprocket assembly according to the seventeenth aspect, it is possible to save the weight of the bicycle rear sprocket assembly while further improving the balance of rigidity of the bicycle rear sprocket assembly.

In accordance with an eighteenth aspect of the present invention, the bicycle rear sprocket assembly according to any one of the first to seventeenth aspects is configured so that the plurality of sprocket mounting portions is offset from each other in a radial direction with respect to the rotational center axis.

With the bicycle rear sprocket assembly according to the eighteenth aspect, it is possible to effectively arrange the plurality of sprockets on the sprocket carrier.

In accordance with a nineteenth aspect of the present invention, the bicycle rear sprocket assembly according to any one of the first to eighteenth aspects is configured so that the total number of the at least one additional circumferential coupling point is double of the total number of the at least one circumferential coupling point.

With the bicycle rear sprocket assembly according to the nineteenth aspect, it is possible to save the weight of the bicycle rear sprocket assembly while further improving the balance of rigidity of the bicycle rear sprocket assembly.

In accordance with a twentieth aspect of the present invention, a bicycle rear sprocket assembly comprises a first sprocket wheel, a second sprocket wheel, a third sprocket wheel, at least one fastener, and a sprocket carrier. The first sprocket wheel has a first maximum tooth bottom diameter. The second sprocket wheel has a second maximum tooth bottom diameter that is smaller than the first maximum tooth bottom diameter of the first sprocket wheel. The third sprocket wheel has a third maximum tooth bottom diameter that is larger than the first maximum tooth bottom diameter of the first sprocket wheel. The sprocket carrier includes a central portion and a plurality of sprocket mounting arms extending radially outwardly from the central portion with respect to a rotational center axis of the bicycle rear sprocket assembly. The sprocket carrier includes a first circumferential sprocket-mounting portion and a second circumferential sprocket-mounting portion. The first circumferential sprocket-mounting portion is provided to the plurality of sprocket mounting arms. The second circumferential sprocket-mounting portion is provided to the plurality of sprocket mounting arms and disposed radially inwardly from the first circumferential sprocket-mounting portion with respect to the rotational center axis. The first circumferential sprocket-mounting portion is configured to support the first sprocket wheel. The second circumferential sprocket-mounting portion is configured to support the second sprocket wheel. The third sprocket wheel is configured to be coupled to the first sprocket wheel with the at least one fastener. The first sprocket wheel is disposed between the second sprocket wheel and the third sprocket wheel in an axial direction with respect to the rotational center axis. The twentieth aspect of the present invention can be combined with any one of the first to nineteenth aspects.

With the bicycle rear sprocket assembly according to the twentieth aspect, it is possible to save a weight of the bicycle rear sprocket assembly in a multiple rear sprocket assembly.

In accordance with a twenty-first aspect of the present invention, the bicycle rear sprocket assembly according to the twentieth aspect is configured so that the first circumferential sprocket-mounting portion has a first radially extending surface extending radially with respect to the rotational center axis, and a first axially extending surface extending axially with respect to the rotational center axis. The second circumferential sprocket-mounting portion has a second radially extending surface extending radially with respect to the rotational center axis, and a second axially extending surface extending axially with respect to the rotational center axis.

With the bicycle rear sprocket assembly according to the twenty-first aspect, it is possible to improve the rigidity of the bicycle rear sprocket assembly in the multiple rear sprocket assembly.

In accordance with a twenty-second aspect of the present invention, the bicycle rear sprocket assembly according to the twentieth or twenty-first aspect further comprises at least one first fastener and at least one second fastener. The first sprocket wheel has at least one first circumferential coupling point and is coupled to the first circumferential sprocket-mounting portion at the at least one first circumferential coupling point with the at least one first fastener. The second sprocket wheel has at least one second circumferential coupling point and is coupled to the second circumferential sprocket-mounting portion at the at least one second circumferential coupling point with the at least one second fastener.

With the bicycle rear sprocket assembly according to the twenty-second aspect, it is possible to save the weight of the bicycle rear sprocket assembly in the multiple rear sprocket assembly while improving the rigidity of the bicycle rear sprocket assembly in the multiple rear sprocket assembly.

In accordance with a twenty-third aspect of the present invention, the bicycle rear sprocket assembly according to any one of the twentieth to twenty-second aspects further comprises at least one additional fastener and a fourth sprocket wheel configured to be mounted to the third sprocket wheel with the at least one additional fastener. The third sprocket wheel is disposed between the first sprocket wheel and the fourth sprocket wheel in the axial direction.

With the bicycle rear sprocket assembly according to the twenty-third aspect, it is possible to save the weight of the bicycle rear sprocket assembly in the multiple rear sprocket assembly while improving the rigidity of the bicycle rear sprocket assembly in the multiple rear sprocket assembly.

In accordance with a twenty-fourth aspect of the present invention, the bicycle rear sprocket assembly according to any one of the twentieth aspect to the twenty-third aspect is configured so that the central portion of the sprocket carrier has a hub engagement profile.

With the bicycle rear sprocket assembly according to the twenty-fourth aspect, it is possible to effectively transmit a driving force to a wheel.

In accordance with a twenty-fifth aspect of the present invention, the bicycle rear sprocket assembly according to any one of the twentieth to twenty-fourth aspects is configured so that the first sprocket wheel has at least one first circumferential coupling point and is coupled to the first circumferential sprocket-mounting portion at the at least one first circumferential coupling point. The second sprocket wheel has at least one second circumferential coupling point and is coupled to the second circumferential sprocket- mounting portion at the at least one second circumferential coupling point. A total number of the at least one second circumferential coupling point is equal to or larger than a total number of the at least one first circumferential coupling point. The third sprocket wheel has at least one third circumferential coupling point and is coupled to the first sprocket wheel at the at least one third circumferential coupling point. A total number of the at least one third circumferential coupling point is larger than the total number of the at least one first circumferential coupling point.

With the bicycle rear sprocket assembly according to the twenty-fifth aspect, it is possible to save the weight of the bicycle rear sprocket assembly while further improving the balance of rigidity of the bicycle rear sprocket assembly.

In accordance with a twenty-sixth aspect of the present invention, the bicycle rear sprocket assembly according to the twenty-fifth aspect is configured so that the total number of the at least one third circumferential coupling point is double of the total number of the at least one first circumferential coupling point.

With the bicycle rear sprocket assembly according to the twenty-sixth aspect, it is possible to save the weight of the bicycle rear sprocket assembly while further improving the balance of rigidity of the bicycle rear sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
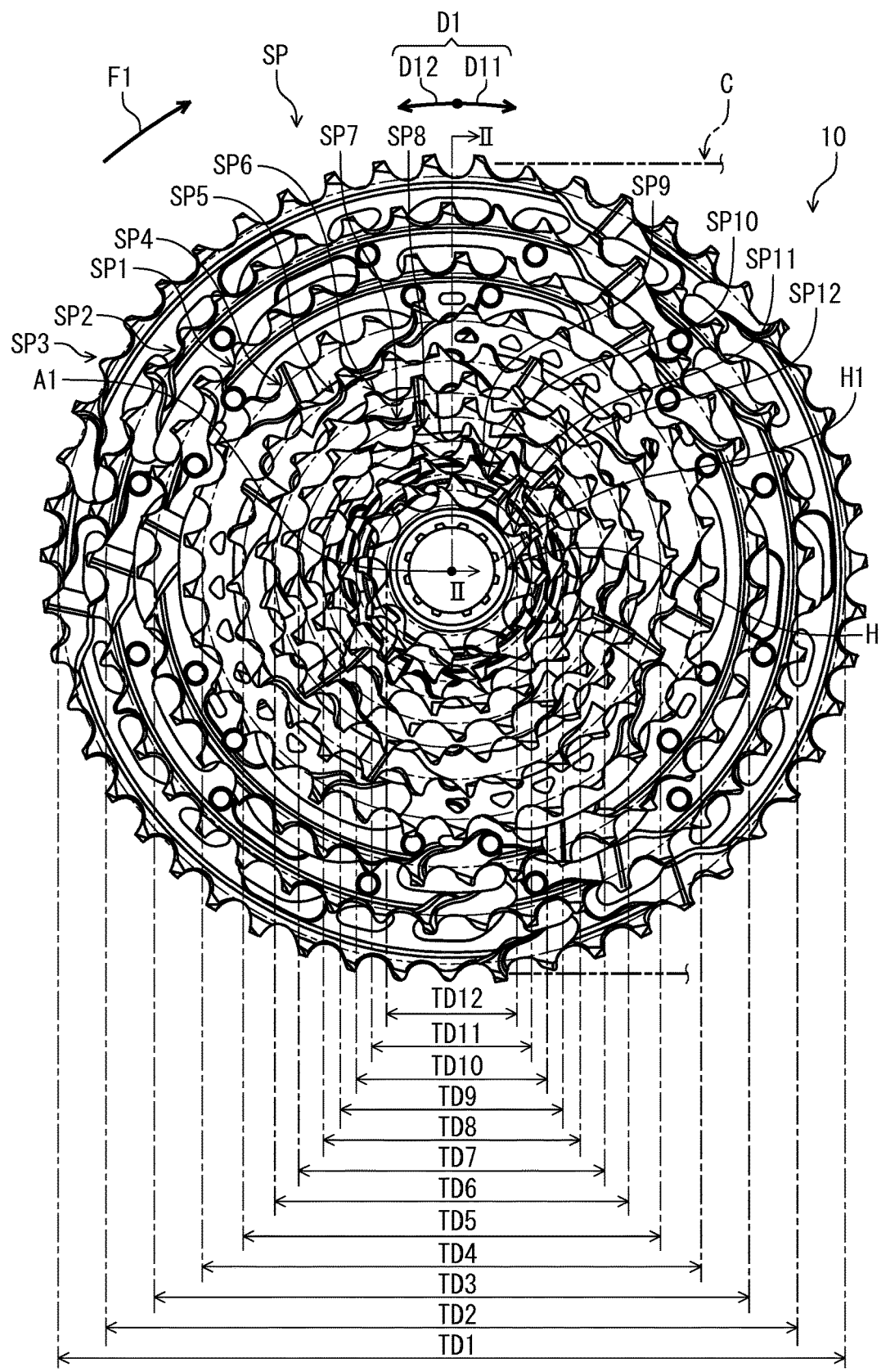
FIG. 1 is a side elevational view of a bicycle rear sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle rear sprocket assembly 10 in accordance with a first embodiment comprises a plurality of sprockets SP. The plurality of sprockets SP includes a first sprocket SP1 and a second sprocket SP2. The plurality of sprockets SP further includes a third sprocket SP3 and a fourth sprocket SP4. The plurality of sprockets SP further includes fifth to twelfth sprockets SP5 to SP12. In this embodiment, the first to twelfth sprockets SP1 to SP12 can also be referred to as sprockets SP1 to SP12, respectively. The third sprocket SP3 can be any sprocket selected from the plurality of sprockets SP3 to SP12 other than the sprocket SP1 and the sprocket SP2. The fourth sprocket SP4 can be any sprocket selected from the plurality of sprockets SP3 to SP12 other than the sprocket SP1, the sprocket SP2 and a sprocket selected as the sprocket SP3.

The first sprocket SP1 can also be referred to as a first sprocket wheel SP1. The second sprocket SP2 can also be referred to as a third sprocket wheel SP2. The third sprocket SP3 can also be referred to as a forth sprocket wheel SP3. The fourth sprocket SP4 can also be referred to as a second sprocket wheel SP4. Namely, the bicycle rear sprocket assembly 10 comprises the first sprocket wheel SP1, the second sprocket wheel SP4, and the third sprocket wheel SP2. The bicycle rear sprocket assembly 10 further comprises the fourth sprocket wheel SP3. The first sprocket wheel SP1 can also be referred to as the sprocket SP1. The second sprocket wheel SP4 can also be referred to as the sprocket SP4. The third sprocket wheel SP2 can also be referred to as the sprocket SP2. The fourth sprocket wheel SP3 can also be referred to as the sprocket SP3. A total number of the sprockets SP1 to SP12 is not limited to this embodiment.

As seen in FIG. 1, the bicycle rear sprocket assembly 10 has a rotational center axis A1. The bicycle rear sprocket assembly 10 is rotatably supported by a bicycle rear hub assembly H relative to a bicycle frame (not shown) about the rotational center axis A1. The bicycle rear sprocket assembly 10 is secured to a sprocket support body of the bicycle rear hub assembly with a lock member H1. The bicycle rear sprocket assembly 10 is configured to be engaged with a bicycle chain C to transmit a driving rotational force F1 between the bicycle chain C and the bicycle rear sprocket assembly 10 during pedaling. The bicycle rear sprocket assembly 10 is rotated about the rotational center axis A1 in a driving rotational direction D11 during pedaling. The driving rotational direction D11 is defined along a circumferential direction D1 with respect to the rotational center axis A1 of the bicycle rear sprocket assembly 10. A reverse rotational direction D12 is an opposite direction of the driving rotational direction D11 and is defined along the circumferential direction D1.

In this embodiment, the sprocket SP3 is the largest sprocket in the bicycle rear sprocket assembly 10. The twelfth sprocket SP12 is the smallest sprocket in the bicycle rear sprocket assembly 10. The first sprocket SP1 has a maximum tooth bottom diameter TD1. The maximum tooth bottom diameter TD1 can also be referred to as a first maximum tooth bottom diameter TD1. Namely, the first sprocket wheel SP1 has the first maximum tooth bottom diameter TD1. The second sprocket SP2 has an additional maximum tooth bottom diameter TD2 that is larger than the maximum tooth bottom diameter TD1 of the first sprocket SP1. The additional maximum tooth bottom diameter TD2 can also be referred to as a third maximum tooth bottom diameter TD2. Namely, the third sprocket wheel SP2 has the third maximum tooth bottom diameter TD2 that is larger than the first maximum tooth bottom diameter TD1 of the first sprocket wheel SP1. The second sprocket wheel SP4 has a second maximum tooth bottom diameter TD4 that is smaller than the first maximum tooth bottom diameter TD1 of the first sprocket wheel SP1. The third sprocket SP3 has an additional maximum tooth bottom diameter TD3 that is larger than the maximum tooth bottom diameter TD1 of the first sprocket SP1. The sprockets SP5 to SP12 respectively have fifth to twelfth maximum tooth bottom diameter TD5 to TD12.

The dimensional relationship among the sprockets SP1 to SP12 is not limited to this embodiment. For example, the additional maximum tooth bottom diameter TD2 can be equal to or smaller than the maximum tooth bottom diameter TD1 of the first sprocket SP1. The second maximum tooth bottom diameter TD4 can be equal to or larger than the first maximum tooth bottom diameter TD1 of the first sprocket wheel SP1.

Figure 2:
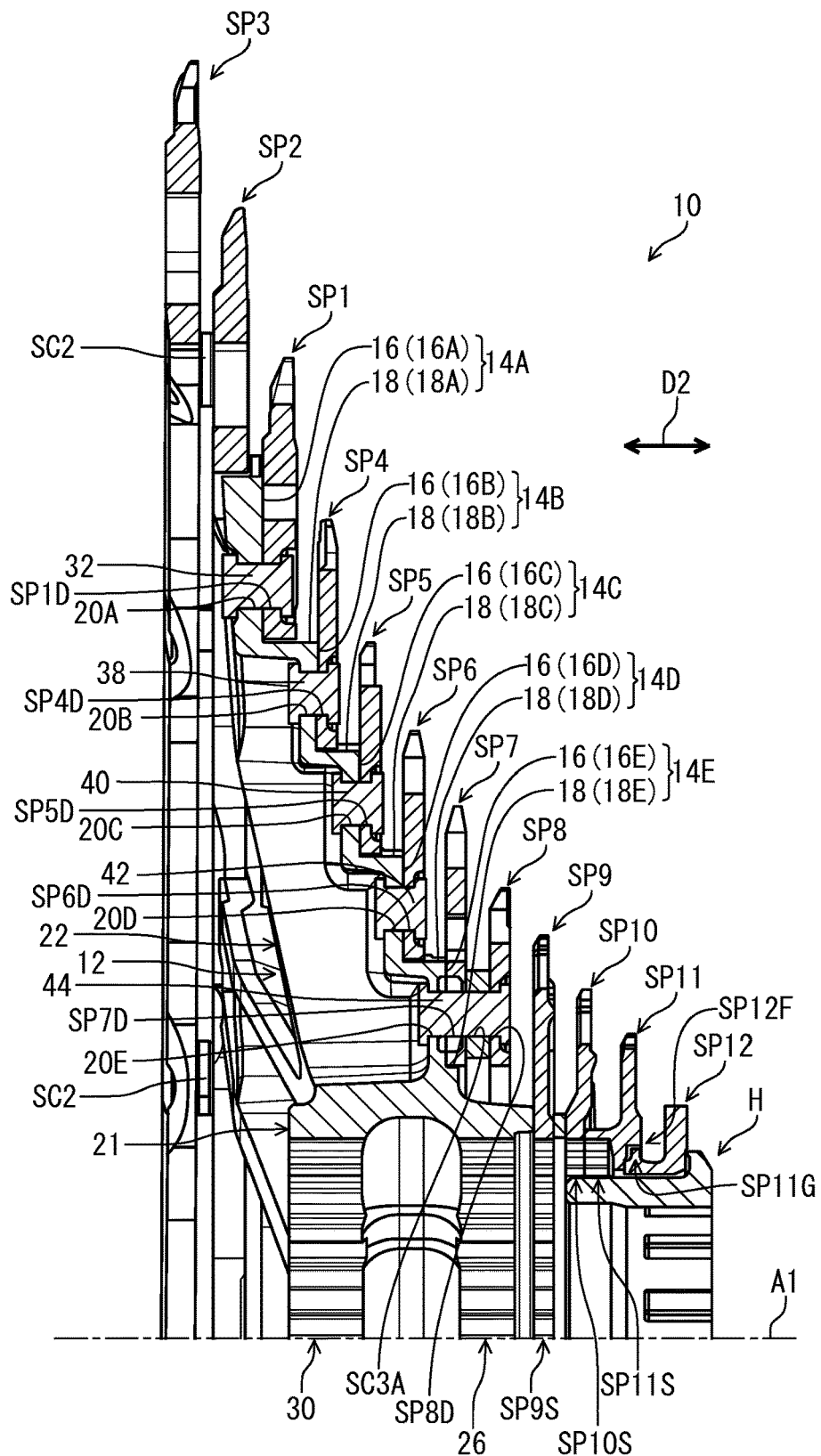
FIG. 2 is a cross-sectional view of the bicycle rear sprocket assembly taken along line II-II of FIG. 1.

As seen in FIG. 2, the first sprocket wheel SP1 is disposed between the second sprocket wheel SP4 and the third sprocket wheel SP2 in an axial direction D2 with respect to the rotational center axis A1. The third sprocket wheel SP2 is disposed between the first sprocket wheel SP1 and the fourth sprocket wheel SP3 in the axial direction D2. The second sprocket SP2 is adjacent to the first sprocket SP1 without another sprocket between the first sprocket SP1 and the second sprocket SP2 in the axial direction D2 with respect to the rotational center axis A1 of the bicycle rear sprocket assembly 10. The third sprocket SP3 is adjacent to the second sprocket SP2 without another sprocket between the second sprocket SP2 and the third sprocket SP3 in the axial direction D2 with respect to the rotational center axis A1 of the bicycle rear sprocket assembly 10. The fourth sprocket SP4 is adjacent to the first sprocket SP1 without another sprocket between the first sprocket SP1 and the fourth sprocket SP4 in the axial direction D2 with respect to the rotational center axis A1 of the bicycle rear sprocket assembly 10. The third sprocket SP3, the second sprocket SP2, the first sprocket SP1, and the fourth to twelfth sprockets SP4 to SP12 are arranged in the axial direction D2 in this order.

In this embodiment, the sprockets SP1 to SP12 are separate members from each other. However, at least two of the sprockets SP1 to SP12 can be at least partly provided integrally with each other. Specifically, at least two of the sprockets SP1 to SP12 can be integrally provided as a unitary, one-piece member. Alternatively, at least two of the sprockets SP1 to SP12 can be connected to each other with at least one mechanical fastener such as a rivet, or with adhesive, diffusion bonding and so on. The sprockets SP1 to SP12 are made of a metallic material. In this embodiment, the first sprocket SP1 is made of titanium. The second sprocket SP2 is made of aluminum. The third sprocket SP3 is made of aluminum. The fourth sprocket SP4 is made of titanium. However, materials of the first to twelfth sprockets SP1 to SP12 is not limited to this embodiment. At least one of the sprockets SP1 to SP12 can be made of another metallic material or a non-metallic material.

Figure 3:
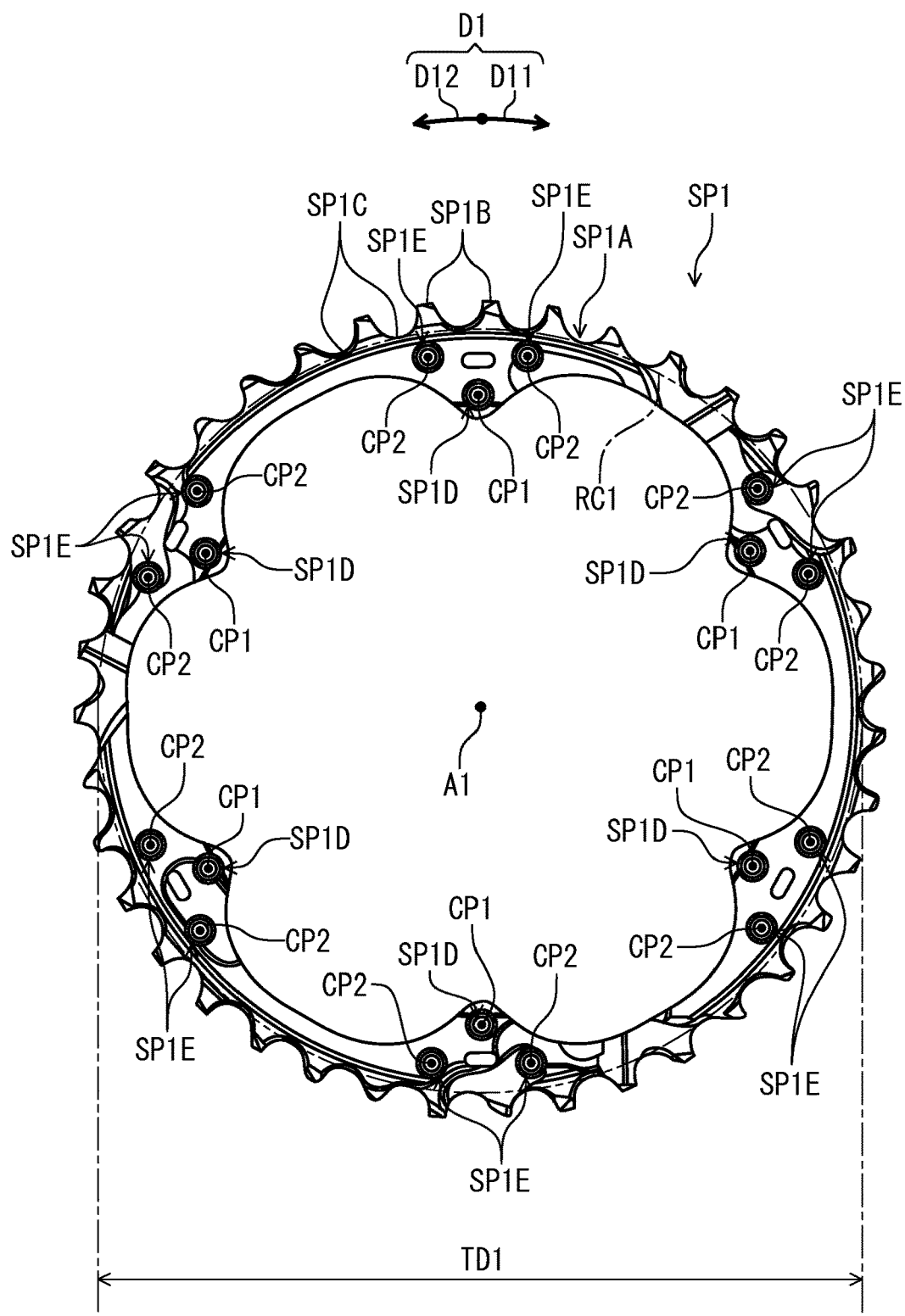
FIG. 3 is a side elevational view of a sprocket of the bicycle rear sprocket assembly illustrated in FIG. 1.

As seen in FIG. 3, the first sprocket SP1 includes a sprocket body SP1A and a plurality of sprocket teeth SP1B. The plurality of sprocket teeth SP1B extends radially outwardly from the sprocket body SP1A with respect to the rotational center axis A1 of the bicycle rear sprocket assembly 10. A total tooth number of the first sprocket SP1 (a total number of the at least one sprocket teeth SP1B) is 39. However, the total number of the plurality of sprocket tooth SP1B of the first sprocket SP1 is not limited to this embodiment.

The first sprocket SP1 includes a plurality of tooth bottoms SP1C. The tooth bottom SP1C is provided between adjacent two of the sprocket teeth SP1B. The plurality of tooth bottoms SP1C defines a root circle RC1 having the maximum tooth bottom diameter TD1. The term "maximum tooth bottom diameter", as used herein, is intended to be a diameter of a root circle defined by tooth bottoms if shapes of all of the toot bottoms are identical with each other, or to be a diameter of a maximum root circle defined by at least one tooth bottom if tooth bottoms having several shapes are provided in one sprocket so that a plurality of root circles are defined in the sprocket. The term definition can be applied to any sprocket in the first to twelfth sprockets SP1 to SP12.

Figure 4:
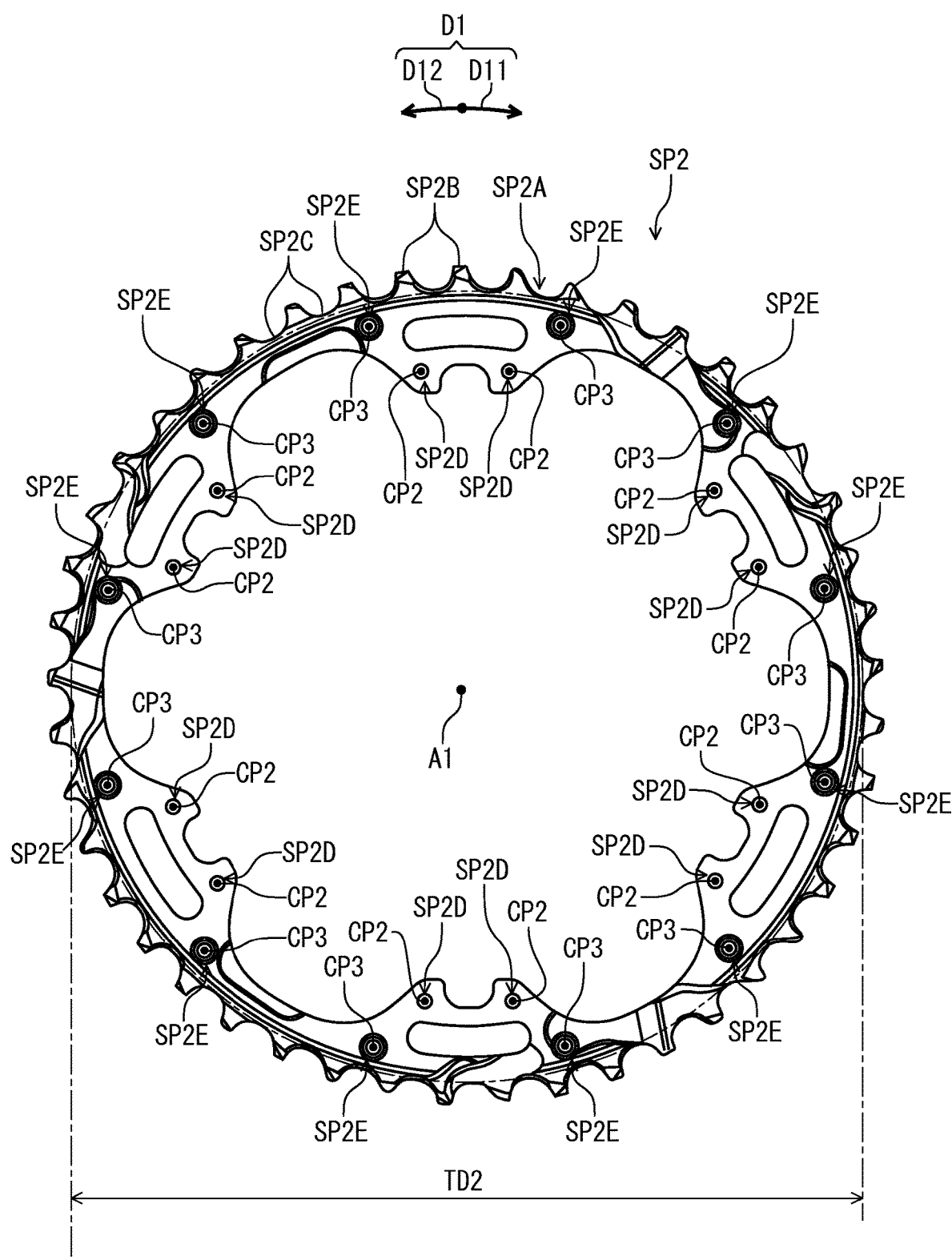
FIG. 4 is a side elevational view of a sprocket of the bicycle rear sprocket assembly illustrated in FIG. 1.

As seen in FIG. 4, the second sprocket SP2 includes a sprocket body SP2A and a plurality of sprocket teeth SP2B. The plurality of sprocket teeth SP2B extends radially outwardly from the sprocket body SP2A with respect to the rotational center axis A1 of the bicycle rear sprocket assembly 10. A total tooth number of the second sprocket SP2 (a total number of the at least one sprocket teeth SP2B) is 45. However, the total number of the plurality of sprocket tooth SP2B of the second sprocket SP2 is not limited to this embodiment.

The second sprocket SP2 includes a plurality of tooth bottoms SP2C. The tooth bottom SP2C is provided between adjacent two of the sprocket teeth SP2B. The plurality of tooth bottoms SP2C defines a root circle RC2 having the maximum tooth bottom diameter TD2.

Figure 5:
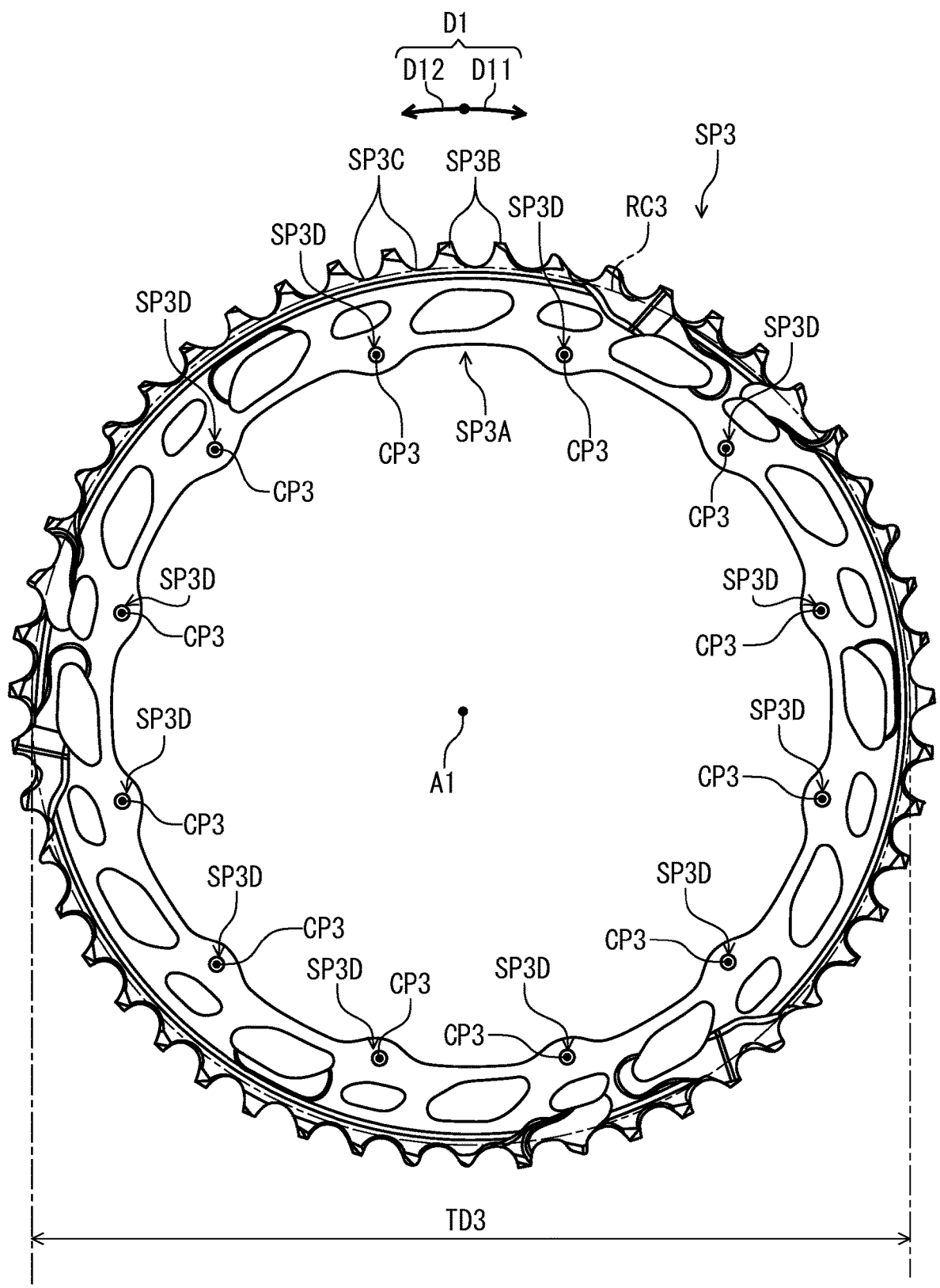
FIG. 5 is a side elevational view of a sprocket of the bicycle rear sprocket assembly illustrated in FIG. 1.

As seen in FIG. 5, the third sprocket SP3 includes a sprocket body SP3A and a plurality of sprocket teeth SP3B. The plurality of sprocket teeth SP3B extends radially outwardly from the sprocket body SP3A with respect to the rotational center axis A1 of the bicycle rear sprocket assembly 10. A total tooth number of the third sprocket SP3 (a total number of the at least one sprocket teeth SP3B) is 51. However, the total number of the plurality of sprocket tooth SP3B of the third sprocket SP3 is not limited to this embodiment.

The third sprocket SP3 includes a plurality of tooth bottoms SP3C. The tooth bottom SP3C is provided between adjacent two of the sprocket teeth SP3B. The plurality of tooth bottoms SP3C defines a root circle RC3 having the maximum tooth bottom diameter TD3.

Figure 6:
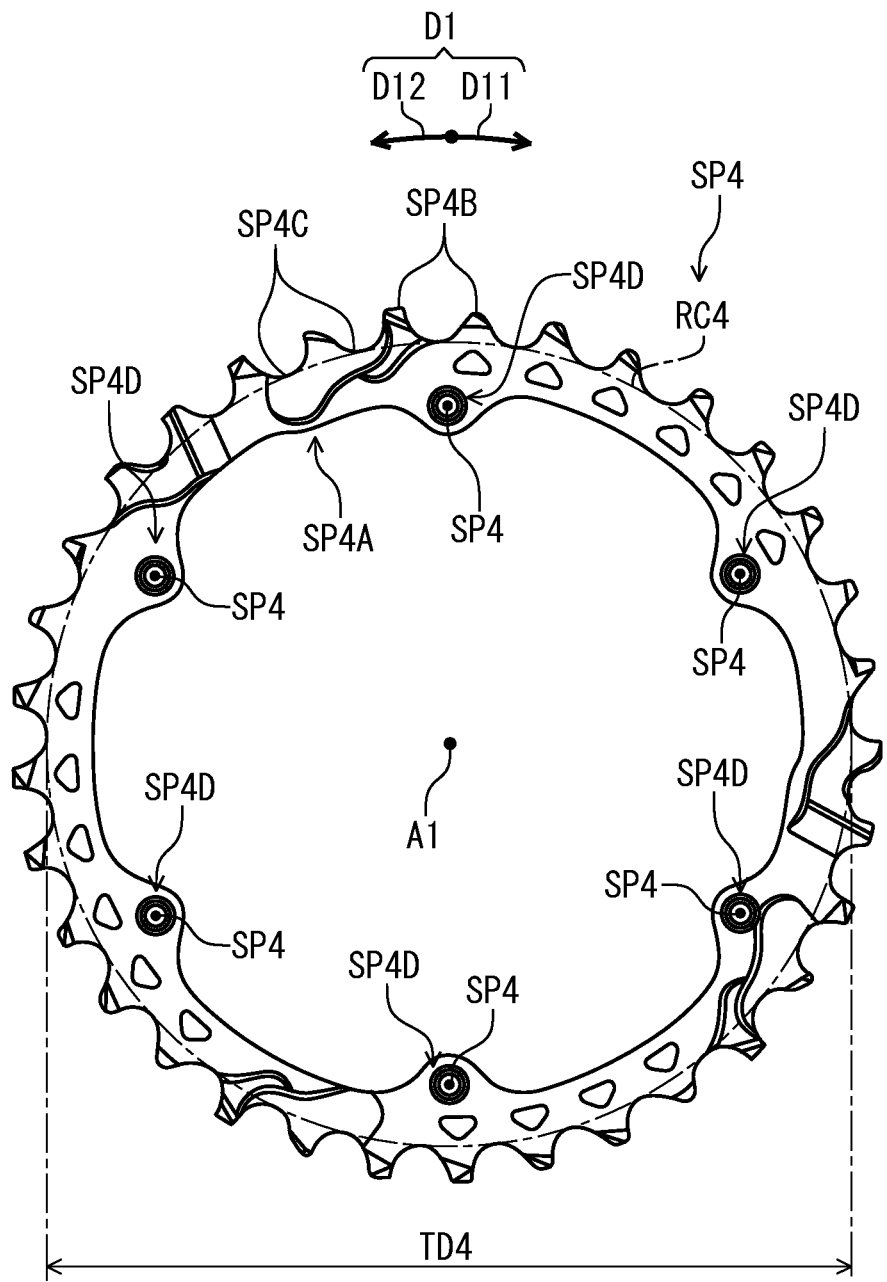
FIG. 6 is a side elevational view of a sprocket of the bicycle rear sprocket assembly illustrated in FIG. 1.

As seen in FIG. 6, the fourth sprocket SP4 includes a sprocket body SP4A and a plurality of sprocket teeth SP4B. The plurality of sprocket teeth SP4B extends radially outwardly from the sprocket body SP4A with respect to the rotational center axis A1 of the bicycle rear sprocket assembly 10. A total tooth number of the fourth sprocket SP4 (a total number of the at least one sprocket teeth SP4B) is 33. However, the total number of the plurality of sprocket tooth SP4B of the fourth sprocket SP4 is not limited to this embodiment.

The fourth sprocket SP4 includes a plurality of tooth bottoms SP4C. The tooth bottom SP4C is provided between adjacent two of the sprocket teeth SP4B. The plurality of tooth bottoms SP4C defines a root circle RC4 having the maximum tooth bottom diameter TD4.

Figure 7:
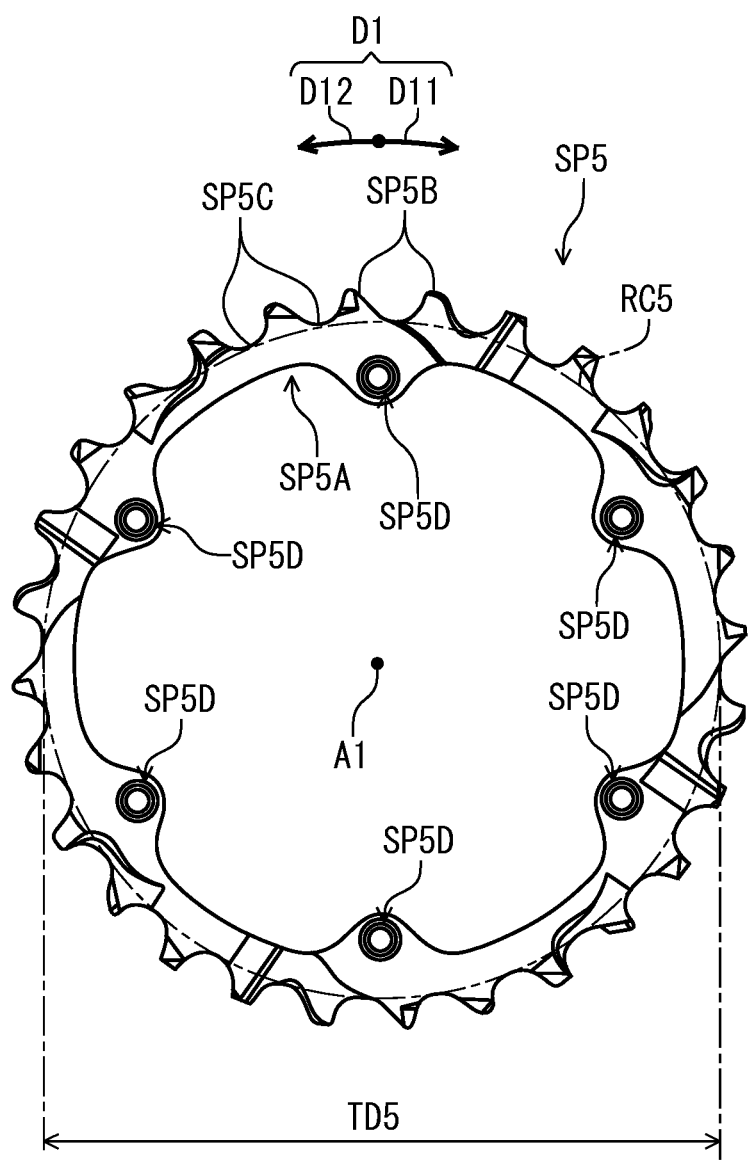
FIG. 7 is a side elevational view of a sprocket of the bicycle rear sprocket assembly illustrated in FIG. 1.

As seen in FIG. 7, the fifth sprocket SP5 includes a sprocket body SP5A and a plurality of sprocket teeth SP5B. The plurality of sprocket teeth SP5B extends radially outwardly from the sprocket body SP5A with respect to the rotational center axis A1 of the bicycle rear sprocket assembly 10. A total tooth number of the fifth sprocket SP5 (a total number of the at least one sprocket teeth SP5B) is 28. However, the total number of the plurality of sprocket tooth SP5B of the fifth sprocket SP5 is not limited to this embodiment.

The fifth sprocket SP5 includes a plurality of tooth bottoms SP5C. The tooth bottom SP5C is provided between adjacent two of the sprocket teeth SP5B. The plurality of tooth bottoms SP5C defines a root circle RC5 having the maximum tooth bottom diameter TD5.

Figure 8:
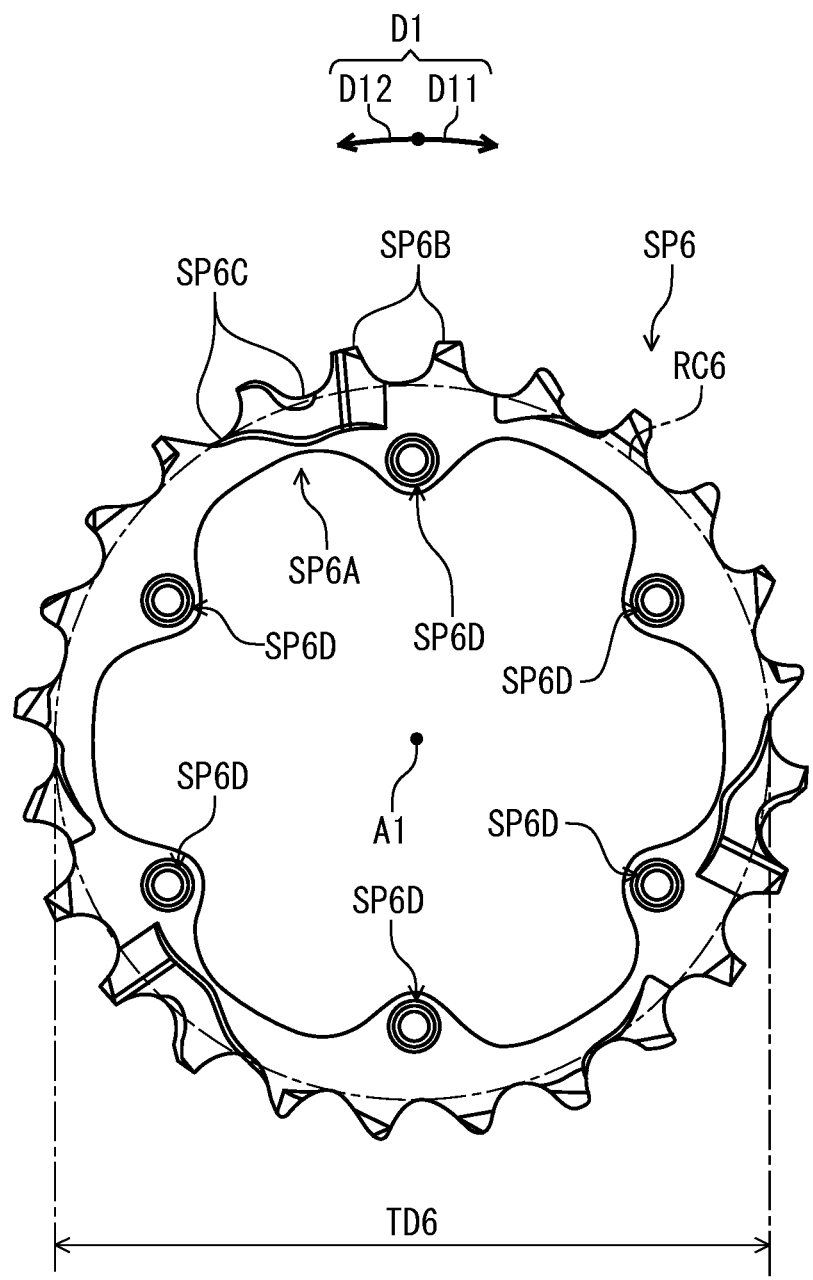
FIG. 8 is a side elevational view of a sprocket of the bicycle rear sprocket assembly illustrated in FIG. 1.

As seen in FIG. 8, the sixth sprocket SP6 includes a sprocket body SP6A and a plurality of sprocket teeth SP6B. The plurality of sprocket teeth SP6B extends radially outwardly from the sprocket body SP6A with respect to the rotational center axis A1 of the bicycle rear sprocket assembly 10. A total tooth number of the sixth sprocket SP6 (a total number of the at least one sprocket teeth SP6B) is 24. However, the total number of the plurality of sprocket tooth SP6B of the sixth sprocket SP6 is not limited to this embodiment.

The sixth sprocket SP6 includes a plurality of tooth bottoms SP6C. The tooth bottom SP6C is provided between adjacent two of the sprocket teeth SP6B. The plurality of tooth bottoms SP6C defines a root circle RC6 having the maximum tooth bottom diameter TD6.

Figure 9:
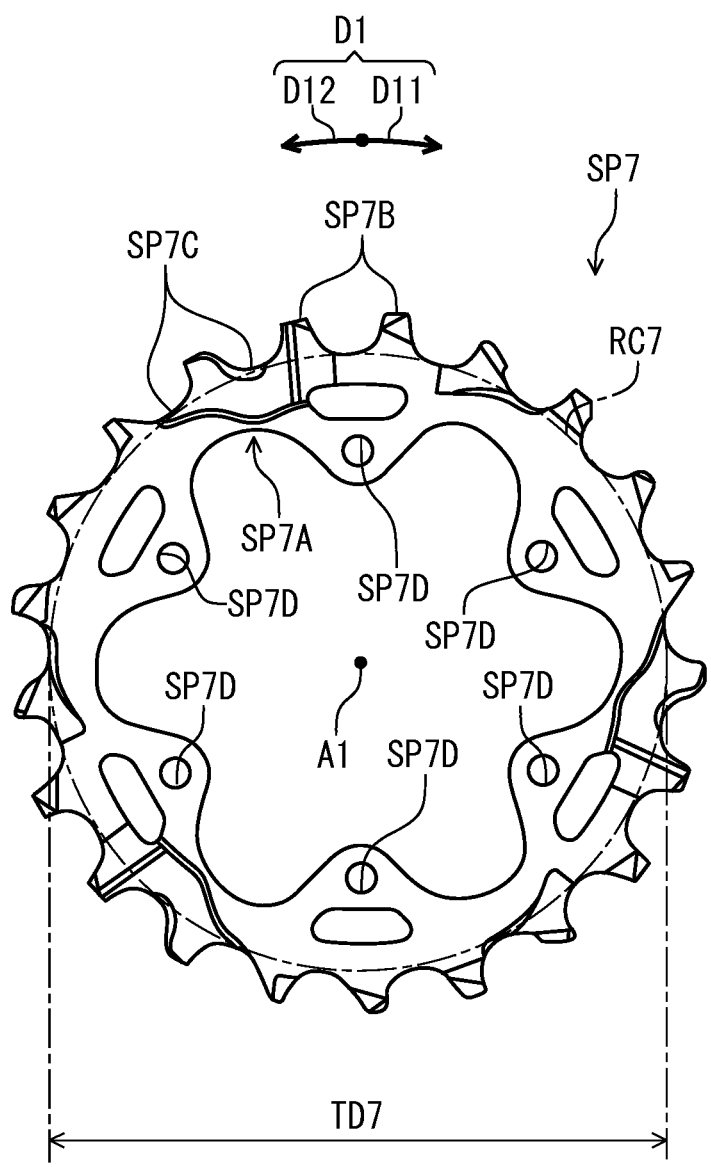
FIG. 9 is a side elevational view of a sprocket of the bicycle rear sprocket assembly illustrated in FIG. 1.

As seen in FIG. 9, the seventh sprocket SP7 includes a sprocket body SP7A and a plurality of sprocket teeth SP7B. The plurality of sprocket teeth SP7B extends radially outwardly from the sprocket body SP7A with respect to the rotational center axis A1 of the bicycle rear sprocket assembly 10. A total tooth number of the seventh sprocket SP7 (a total number of the at least one sprocket teeth SP7B) is 21. However, the total number of the plurality of sprocket tooth SP7B of the seventh sprocket SP7 is not limited to this embodiment.

The seventh sprocket SP7 includes a plurality of tooth bottoms SP7C. The tooth bottom SP7C is provided between adjacent two of the sprocket teeth SP7B. The plurality of tooth bottoms SP7C defines a root circle RC7 having the maximum tooth bottom diameter TD7.

Figure 10:
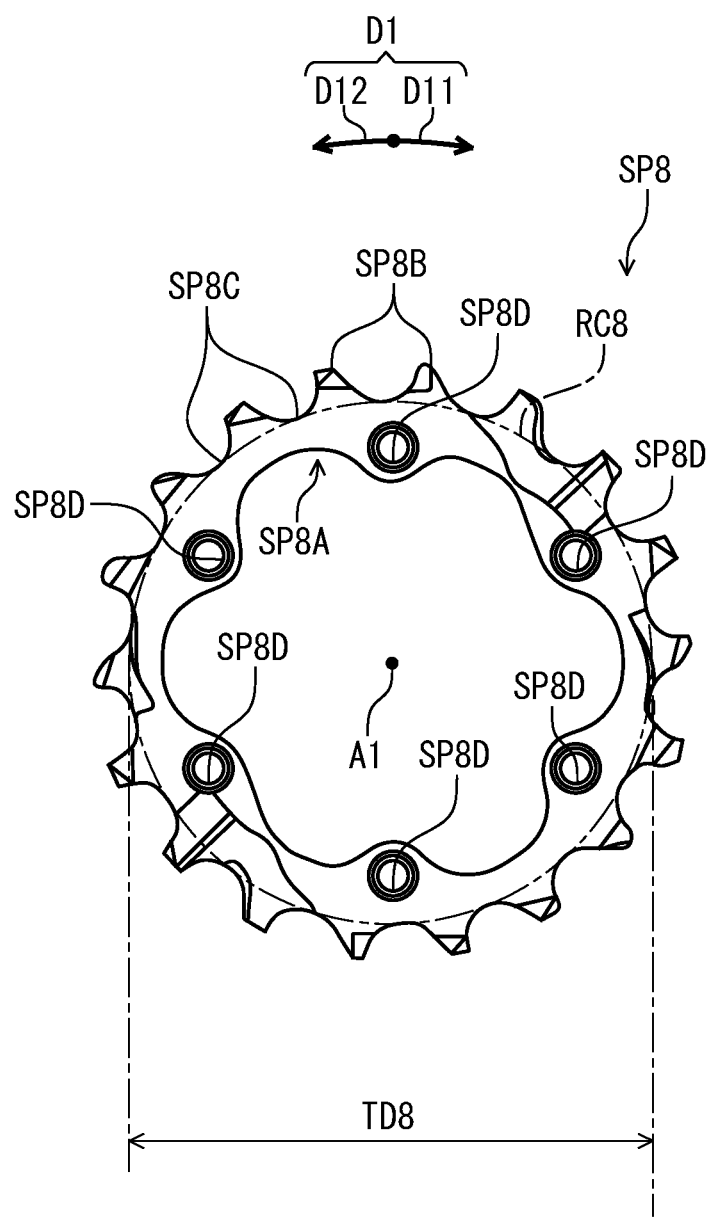
FIG. 10 is a side elevational view of a sprocket of the bicycle rear sprocket assembly illustrated in FIG. 1.

As seen in FIG. 10, the eighth sprocket SP8 includes a sprocket body SP8A and a plurality of sprocket teeth SP8B. The plurality of sprocket teeth SP8B extends radially outwardly from the sprocket body SP8A with respect to the rotational center axis A1 of the bicycle rear sprocket assembly 10. A total tooth number of the eighth sprocket SP8 (a total number of the at least one sprocket teeth SP8B) is 21. However, the total number of the plurality of sprocket tooth SP8B of the eighth sprocket SP8 is not limited to this embodiment.

The eighth sprocket SP8 includes a plurality of tooth bottoms SP8C. The tooth bottom SP8C is provided between adjacent two of the sprocket teeth SP8B. The plurality of tooth bottoms SP8C defines a root circle RC8 having the maximum tooth bottom diameter TDB.

Figure 11:
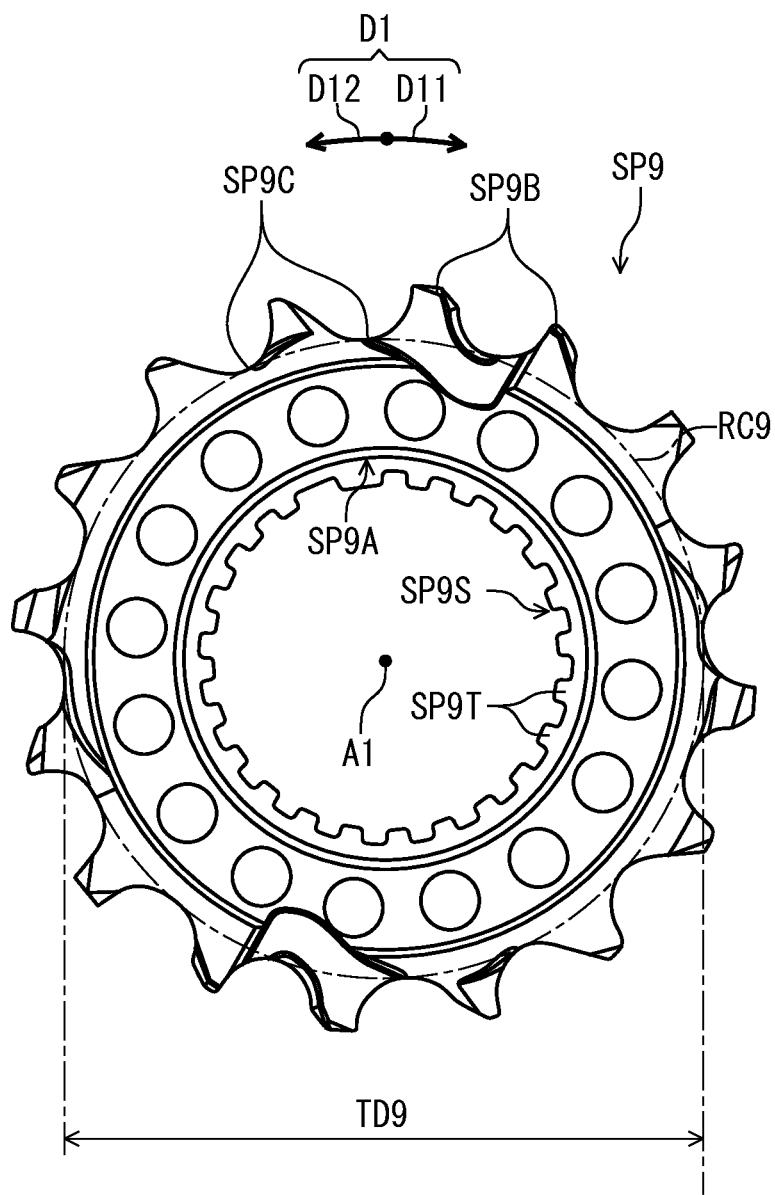
FIG. 11 is a side elevational view of a sprocket of the bicycle rear sprocket assembly illustrated in FIG. 1.

As seen in FIG. 11, the ninth sprocket SP9 includes a sprocket body SP9A and a plurality of sprocket teeth SP9B. The plurality of sprocket teeth SP9B extends radially outwardly from the sprocket body SP9A with respect to the rotational center axis A1 of the bicycle rear sprocket assembly 10. A total tooth number of the ninth sprocket SP9 (a total number of the at least one sprocket teeth SP9B) is 16. However, the total number of the plurality of sprocket tooth SP9B of the ninth sprocket SP9 is not limited to this embodiment.

The ninth sprocket SP9 includes a plurality of tooth bottoms SP9C. The tooth bottom SP9C is provided between adjacent two of the sprocket teeth SP9B. The plurality of tooth bottoms SP9C defines a root circle RC9 having the maximum tooth bottom diameter TD9.

Figure 12:
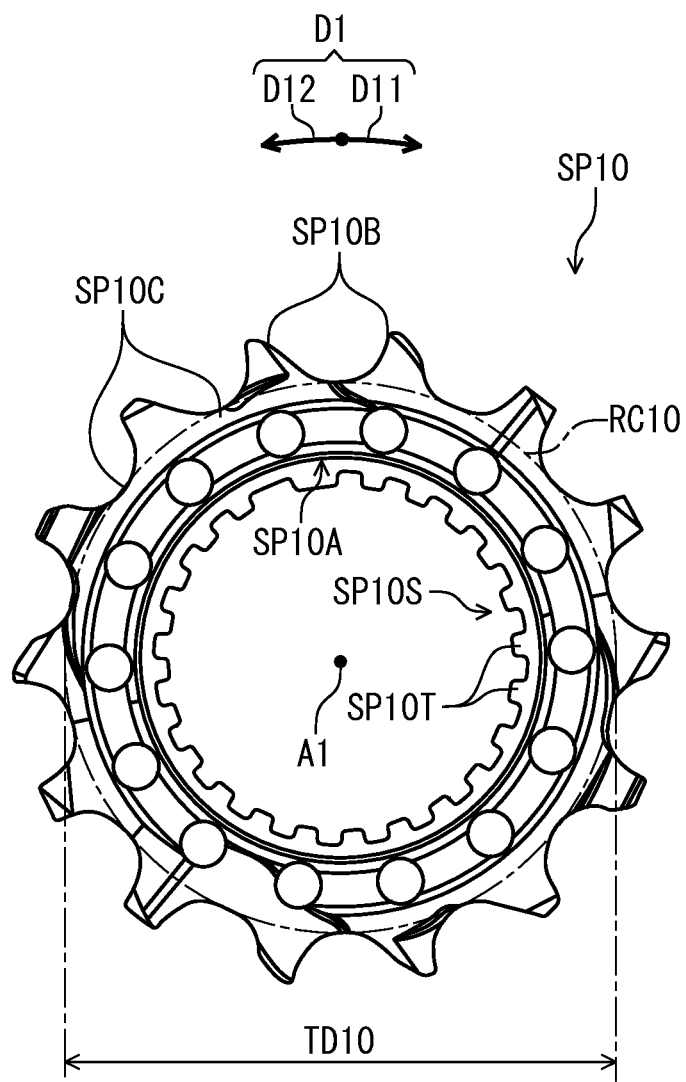
FIG. 12 is a side elevational view of a sprocket of the bicycle rear sprocket assembly illustrated in FIG. 1.

As seen in FIG. 12, the tenth sprocket SP10 includes a sprocket body SP10A and a plurality of sprocket teeth SP10B. The plurality of sprocket teeth SP1OB extends radially outwardly from the sprocket body SP10A with respect to the rotational center axis A1 of the bicycle rear sprocket assembly 10. A total tooth number of the tenth sprocket SP10 (a total number of the at least one sprocket teeth SP10B) is 14. However, the total number of the plurality of sprocket tooth SP1OB of the tenth sprocket SP10 is not limited to this embodiment.

The tenth sprocket SP10 includes a plurality of tooth bottoms SP10C. The tooth bottom SP10C is provided between adjacent two of the sprocket teeth SP10B. The plurality of tooth bottoms SP10C defines a root circle RC10 having the maximum tooth bottom diameter TD10.

Figure 13:
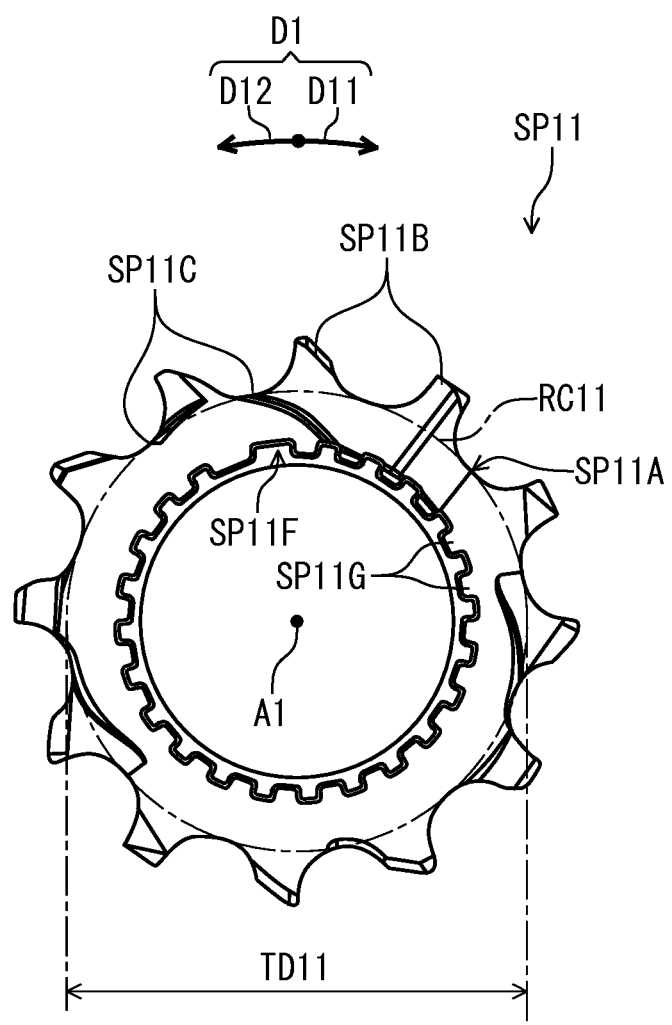
FIG. 13 is a side elevational view of a sprocket of the bicycle rear sprocket assembly illustrated in FIG. 1.

As seen in FIG. 13, the eleventh sprocket SP11 includes a sprocket body SP11A and a plurality of sprocket teeth SP11B. The plurality of sprocket teeth SP11B extends radially outwardly from the sprocket body SP11A with respect to the rotational center axis Al of the bicycle rear sprocket assembly 10. A total tooth number of the eleventh sprocket SP11 (a total number of the at least one sprocket teeth SP11B) is 12. However, the total number of the plurality of sprocket tooth SP11B of the eleventh sprocket SP11 is not limited to this embodiment.

The eleventh sprocket SP11 includes a plurality of tooth bottoms SP11C. The tooth bottom SP11C is provided between adjacent two of the sprocket teeth SP11B. The plurality of tooth bottoms SP11C defines a root circle RC11 having the maximum tooth bottom diameter TD11.

Figure 14:
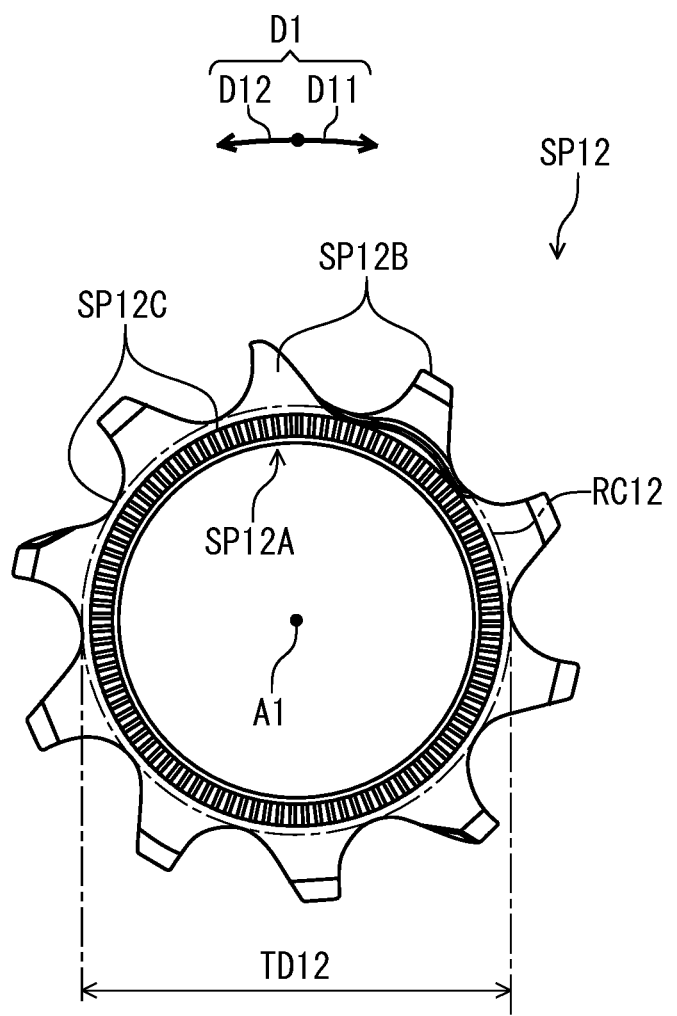
FIG. 14 is a side elevational view of a sprocket of the bicycle rear sprocket assembly illustrated in FIG. 1.

As seen in FIG. 14, the twelfth sprocket SP12 includes a sprocket body SP12A and a plurality of sprocket teeth SP12B. The plurality of sprocket teeth SP12B extends radially outwardly from the sprocket body SP12A with respect to the rotational center axis Al of the bicycle rear sprocket assembly 10. A total tooth number of the twelfth sprocket SP12 (a total number of the at least one sprocket teeth SP12B) is 10. However, the total number of the plurality of sprocket tooth SP12B of the twelfth sprocket SP12 is not limited to this embodiment.

The twelfth sprocket SP12 includes a plurality of tooth bottoms SP12C. The tooth bottom SP12C is provided between adjacent two of the sprocket teeth SP12B. The plurality of tooth bottoms SP12C defines a root circle RC12 having the maximum tooth bottom diameter TD12.

Figure 15:
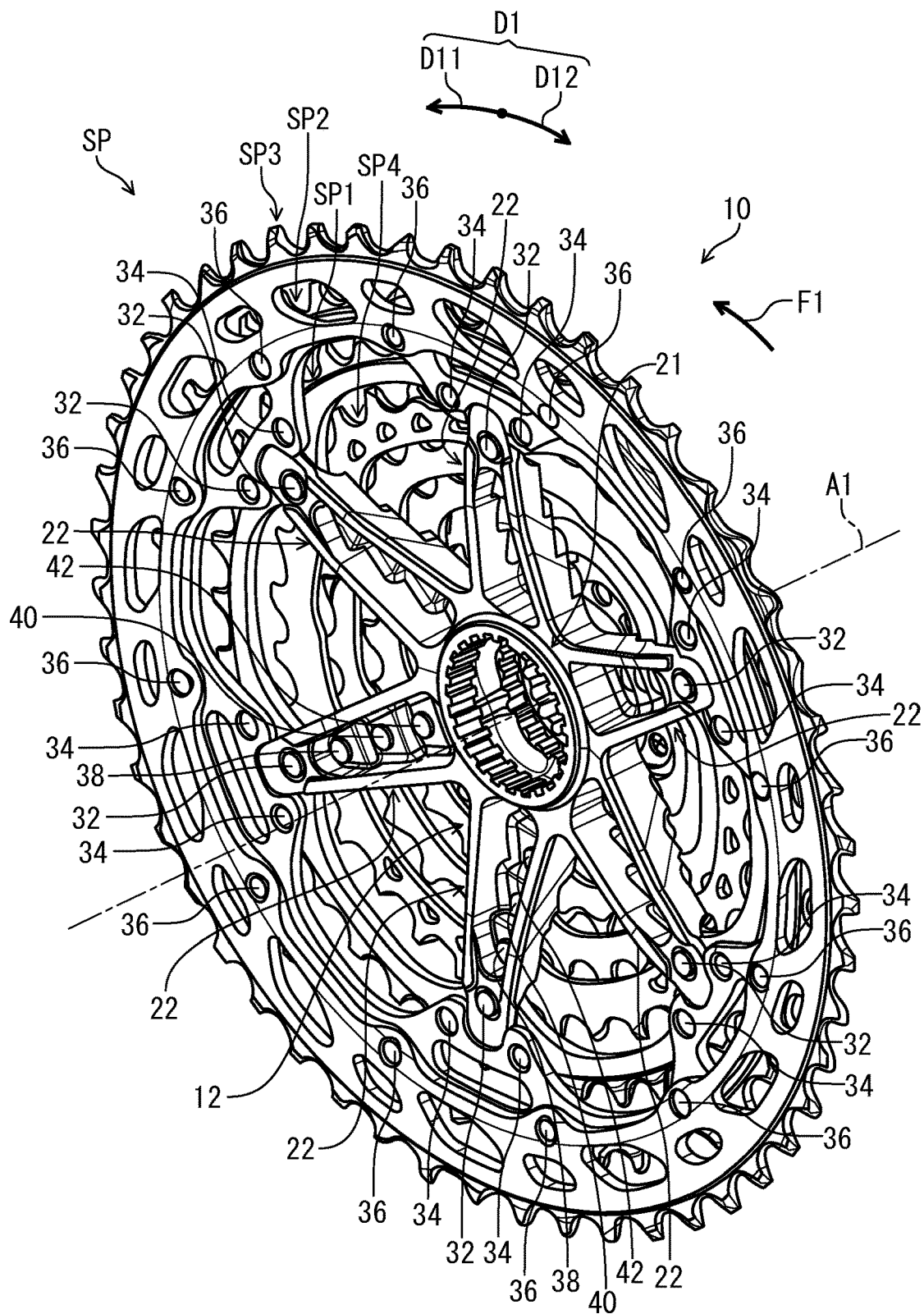
FIG. 15 is a perspective view of the bicycle rear sprocket assembly illustrated in FIG. 1.

As seen in FIG. 15, the bicycle rear sprocket assembly 10 comprises a sprocket carrier 12. The sprocket carrier 12 is a separate member from the plurality of sprockets SP. As seen in FIG. 2, the sprockets SP1 and SP4 to SP8 are attached to the sprocket carrier 12. In this embodiment, the sprocket carrier 12 is made of aluminum. However, the sprocket carrier 12 can be made of a metallic material other than aluminum or a non-metallic material such as fiber reinforced plastics.

Figure 16:
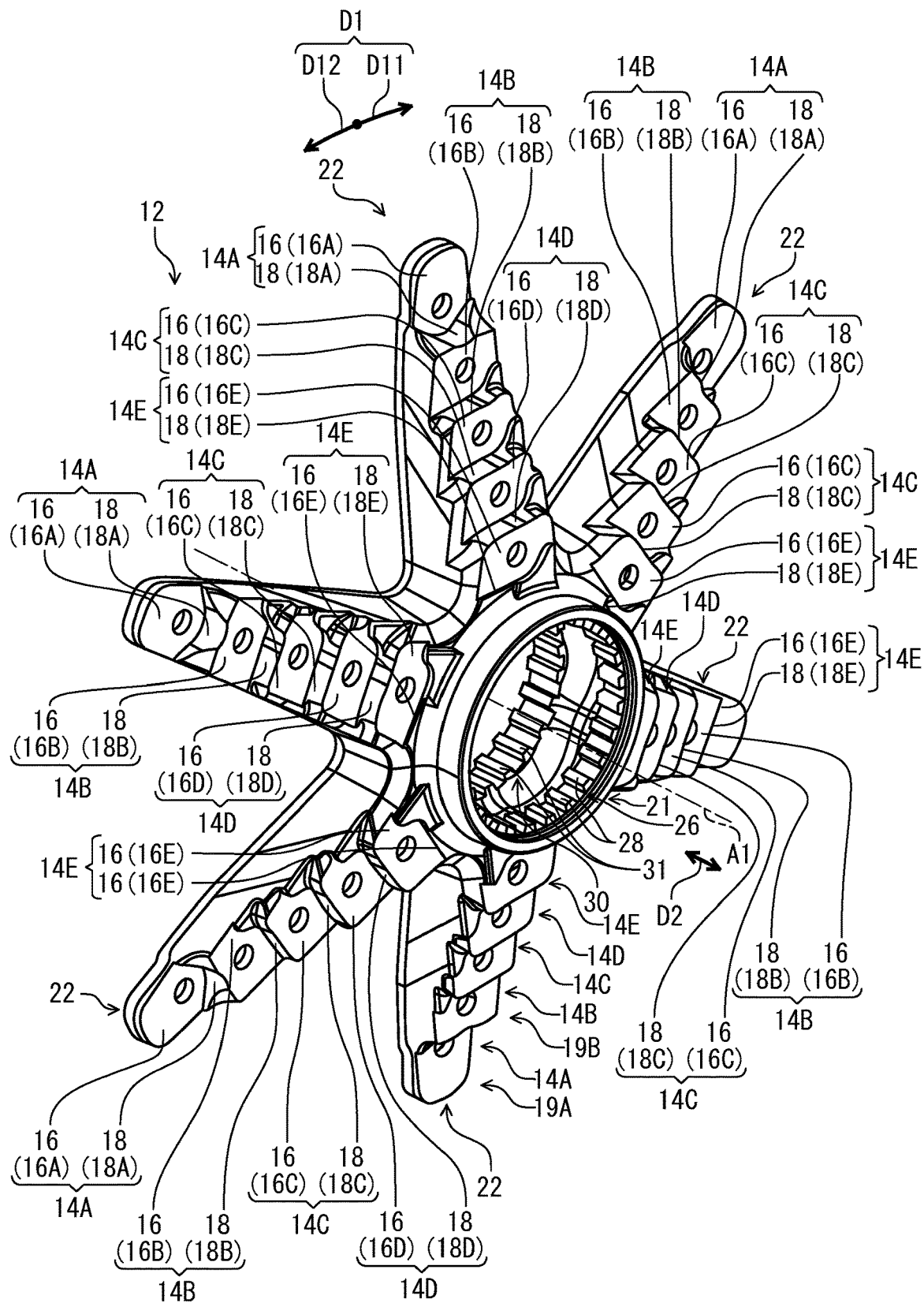
FIG. 16 is a perspective view of a sprocket carrier of the bicycle rear sprocket assembly illustrated in FIG. 1.

As seen in FIG. 16, the sprocket carrier 12 includes a plurality of sprocket mounting portions 14A to 14E. At least one of the plurality of sprocket mounting portions 14A to 14E has a radially extending surface 16 and an axially extending surface 18. In this embodiment, the plurality of sprocket mounting portions 14A to 14E each has the radially extending surface 16 and the axially extending surface 18. The sprocket mounting portion 14A has the radially extending surface 16A and the axially extending surface 18A. The sprocket mounting portion 14B has the radially extending surface 16B and the axially extending surface 18B. The sprocket mounting portion 14C has the radially extending surface 16C and the axially extending surface 18C. The sprocket mounting portion 14D has the radially extending surface 16D and the axially extending surface 18D. The sprocket mounting portion 14E has the radially extending surface 16E and the axially extending surface 18E.

The radially extending surface 16A extends radially with respect to the rotational center axis A1 of the bicycle rear sprocket assembly 10. The axially extending surface 18A extends axially from the radially extending surface 16A with respect to the rotational center axis A1. The radially extending surface 16B extends radially with respect to the rotational center axis A1 of the bicycle rear sprocket assembly 10. The axially extending surface 18B extends axially from the radially extending surface 16B with respect to the rotational center axis A1. The radially extending surface 16C extends radially with respect to the rotational center axis A1 of the bicycle rear sprocket assembly 10. The axially extending surface 18C extends axially from the radially extending surface 16C with respect to the rotational center axis A1. The radially extending surface 16D extends radially with respect to the rotational center axis A1 of the bicycle rear sprocket assembly 10. The axially extending surface 18D extends axially from the radially extending surface 16D with respect to the rotational center axis A1. The radially extending surface 16E extends radially with respect to the rotational center axis A1 of the bicycle rear sprocket assembly 10. The axially extending surface 18E extends axially from the radially extending surface 16E with respect to the rotational center axis A1. The radially extending surface 16A can also be referred to as a first radially extending surface 16A. The axially extending surface 18A can also be referred to as a first axially extending surface 18A. The radially extending surface 16B can also be referred to as a second radially extending surface 16B. The axially extending surface 18B can also be referred to as a second axially extending surface 18B.

In other words, the sprocket carrier 12 includes a first circumferential sprocket-mounting portion 19A and a second circumferential sprocket-mounting portion 19B. The first circumferential sprocket-mounting portion 19A is provided to the plurality of sprocket mounting arms 22. The second circumferential sprocket-mounting portion 19B is provided to the plurality of sprocket mounting arms 22 and is disposed radially inwardly from the first circumferential sprocket-mounting portion 19A with respect to the rotational center axis A1. The first circumferential sprocket-mounting portion 19A is configured to support the first sprocket wheel SP1. The second circumferential sprocket-mounting portion 19B is configured to support the second sprocket wheel SP4.

Figure 17:
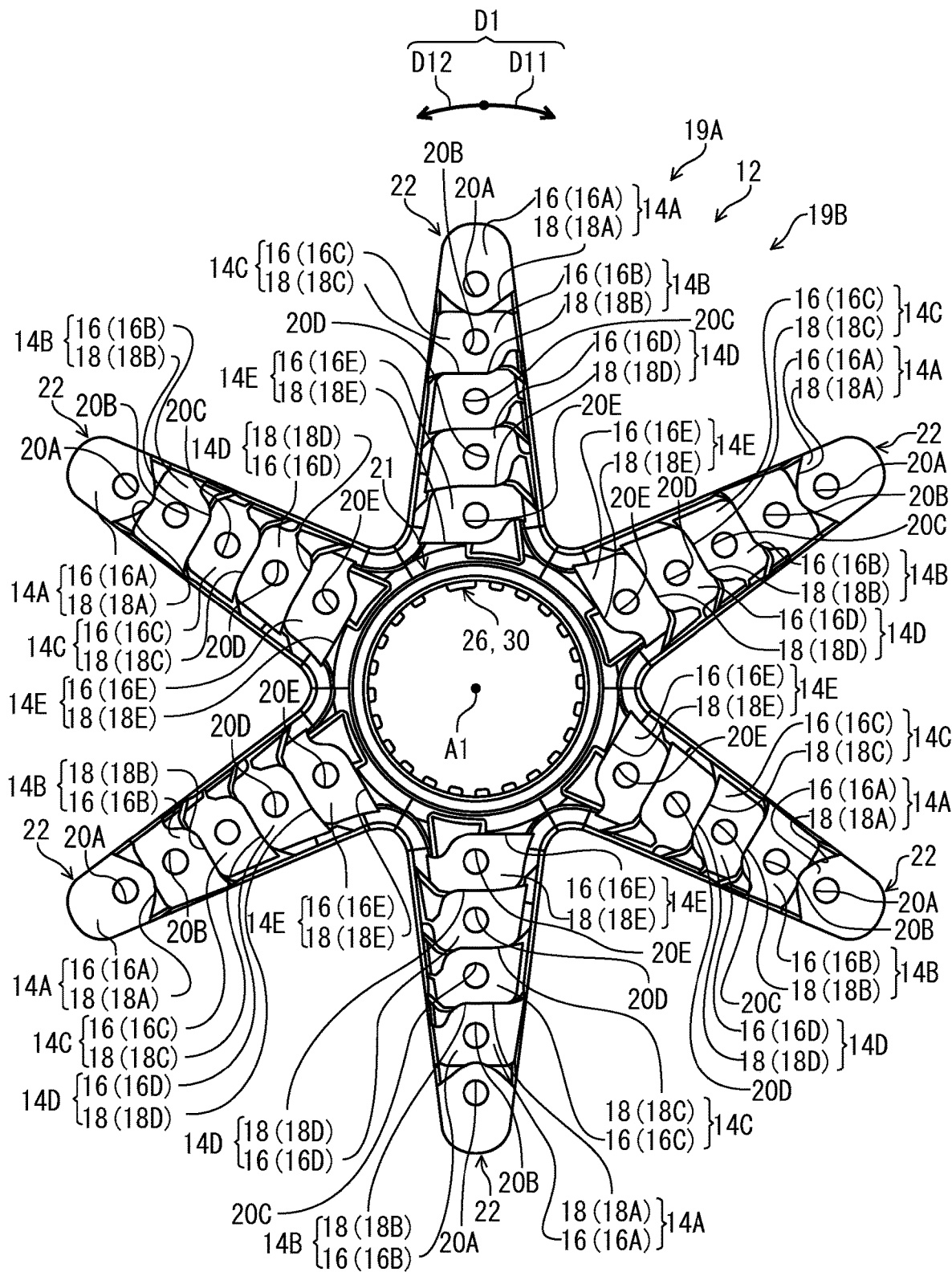
FIG. 17 is a side elevational view of the sprocket carrier of the bicycle rear sprocket assembly illustrated in FIG. 1.

As seen in FIG. 17, the first circumferential sprocket-mounting portion 19A has the first radially extending surface 16A and the first axially extending surface 18A. The first radially extending surface 16A extends radially with respect to the rotational center axis A1. The first axially extending surface 18 (18A) extends axially with respect to the rotational center axis A1. In this embodiment, the first circumferential sprocket-mounting portion 19A has a plurality of first radially extending surfaces 16A and a plurality of first axially extending surfaces 18A.

The second circumferential sprocket-mounting portion 19B has the second radially extending surface 16B and the second axially extending surface 18B. The second radially extending surface 16B extends radially with respect to the rotational center axis A1. The second axially extending surface 18B extends axially with respect to the rotational center axis A1. In this embodiment, the second circumferential sprocket-mounting portion 19B has a plurality of second radially extending surfaces 16B and a plurality of second axially extending surfaces 18B.

As seen in FIG. 17, the plurality of sprocket mounting portions 14A to 14E is offset from each other in a radial direction with respect to the rotational center axis A1. The sprocket mounting portion 14A is radially outwardly of the sprocket mounting portion 14B. The sprocket mounting portion 14B is radially outwardly of the sprocket mounting portion 14C. The sprocket mounting portion 14C is radially outwardly of the sprocket mounting portion 14D. The sprocket mounting portion 14D is radially outwardly of the sprocket mounting portion 14E. The sprocket mounting portions 14A to 14E are arranged along the sprocket mounting arm 22. The arrangement of the sprocket mounting portions 14A to 14E is not limited to this embodiment.

As seen in FIG. 2, in this embodiment, the radially extending surface 16 is substantially perpendicular to the rotational center axis A1. However, the radially extending surface 16 can be inclined relative to the rotational center axis A1. In this embodiment, the axially extending surface 18 is substantially parallel to the rotational center axis A1. However, the axially extending surface 18 can be inclined relative to the rotational center axis A1. Furthermore, the axially extending surface 18 is directly connected to the radially extending surface 16. However, the axially extending surface 18 can be spaced apart from the radially extending surface 16.

As seen in FIG. 16, the sprocket carrier 12 includes a central portion 21 and a plurality of sprocket mounting arms 22 extends radially outwardly from the central portion 21 with respect to the rotational center axis A1 of the bicycle rear sprocket assembly 10. The plurality of sprocket mounting portions 14A to 14E is respectively provided to the plurality of sprocket mounting arms 22. In this embodiment, the sprocket mounting portions 14A to 14E are provided to the sprocket mounting arm 22. However, the arrangement of the sprocket mounting portions 14A to 14E is not limited to this embodiment.

The central portion 21 of the sprocket carrier 12 has a hub engagement profile 24. In this embodiment, the hub engagement profile 24 includes a hub internal spline 26. The hub internal spline 26 includes a plurality of internal spline teeth 28 configured to engage with a plurality of external spline teeth (not shown) of the bicycle rear hub assembly H (FIG. 2). The hub engagement profile 24 includes a hub internal spline 30. The hub internal spline 30 includes a plurality of internal spline teeth 31 configured to engage with the plurality of external spline teeth (not shown) of the bicycle rear hub assembly H (FIG. 2). The hub internal spline 30 is spaced apart from the hub internal spline 26 in the axial direction D2. The hub internal spline 30 can be connected to the hub internal spline 26. However, the structure of the hub engagement profile 24 is not limited to this embodiment. The hub engagement profile 24 can be omitted from the central portion 21 of the sprocket carrier 12. The hub engagement profile 24 can include another structure instead of or in addition to the hub internal splines 26 and 30.

Figure 18:
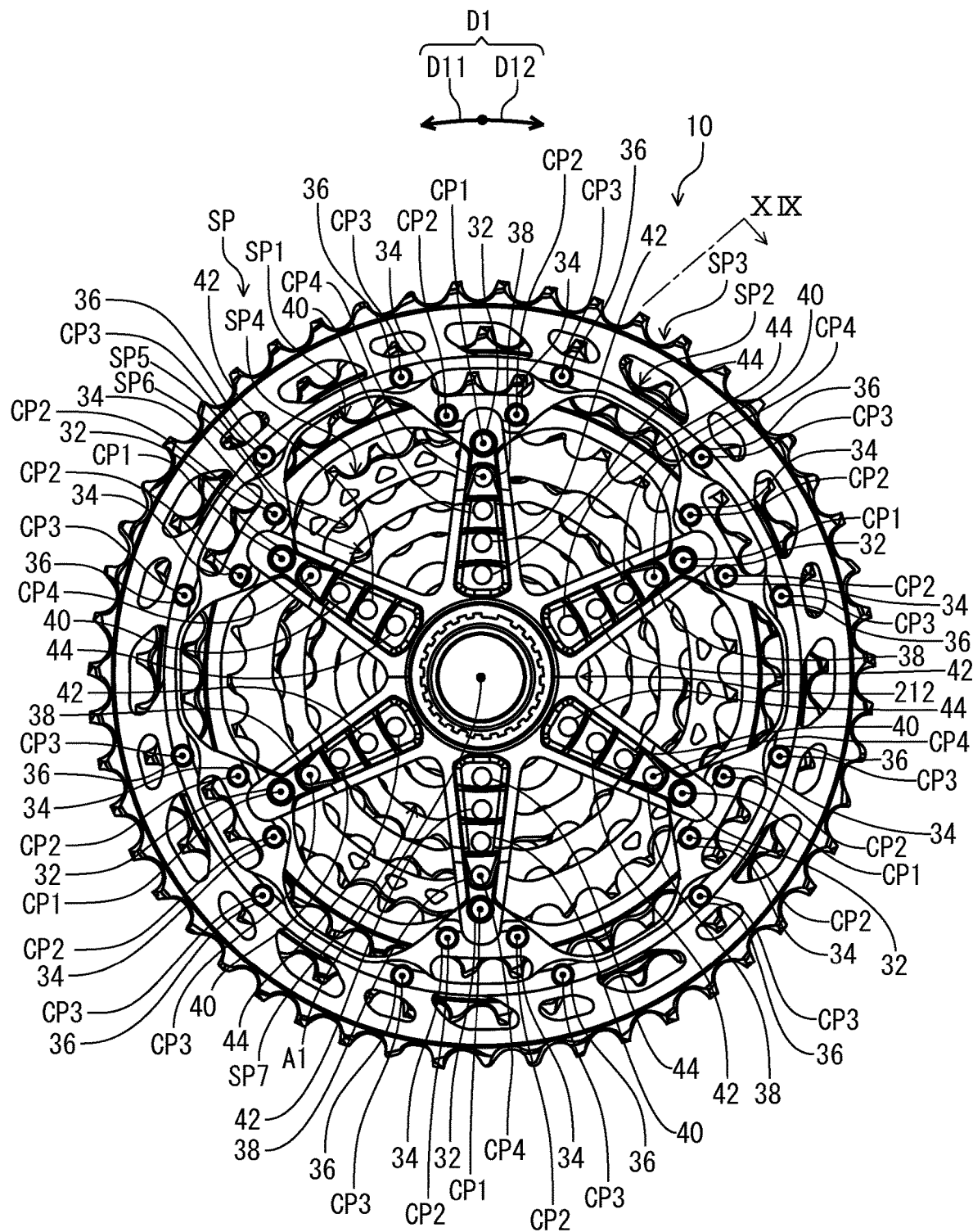
FIG. 18 is another side elevational view of the bicycle rear sprocket assembly illustrated in FIG. 1.

As seen in FIG. 18, the bicycle rear sprocket assembly 10 further comprises at least one fastening member 32. In this embodiment, the bicycle rear sprocket assembly 10 further comprises a plurality of fastening members 32. The first sprocket SP1 is secured to the sprocket carrier 12 with the plurality of fastening members 32. In this embodiment, a total number of the fastening members 32 is 6. However, the total number of the fastening members 32 is not limited to this embodiment. The fastening member 32 is preferably made of a metallic material such as iron or titanium. The fastening member 32 can also be made of aluminum. However, the at least one fastening member 32 can be made of a non-metallic material. In this embodiment, the fastening member 32 includes a rivet. However, the fastening member 32 can include another fastener such as adhesive or diffusion bonding instead of or in addition to the rivet.

The bicycle rear sprocket assembly 10 further comprises at least one fastening member 34. The fastening member 34 can be also referred to as a fastener 34. Namely, the bicycle rear sprocket assembly 10 comprises at least one fastener 34. In this embodiment, the bicycle rear sprocket assembly 10 further comprises a plurality of fastening members (a plurality of fasteners) 34. The second sprocket SP2 is coupled to the first sprocket SP1 with the plurality of fastening members (the plurality of fasteners) 34. The third sprocket wheel (the second sprocket) SP2 is configured to be coupled to the first sprocket wheel (the first sprocket) SP1 with the at least one fastener (the at least one fastening member) 34.

The bicycle rear sprocket assembly 10 further comprises at least one additional fastening member 36. The additional fastening member 36 can also be referred to as an additional fastener 36. Namely, the bicycle rear sprocket assembly 10 further comprises at least one additional fastener 36. In this embodiment, the bicycle rear sprocket assembly 10 further comprises a plurality of additional fastening members (a plurality of additional fasteners) 36. The third sprocket SP3 is coupled to the second sprocket SP2 with the plurality of additional fastening members 36.

The bicycle rear sprocket assembly 10 further comprises at least one additional fastening member 38. The fastening member 32 can be also referred to as a first fastener 32. The additional fastening member 38 can be also referred to as a second fastener 38. Namely, the bicycle rear sprocket assembly 10 further comprises at least one first fastener 32 and at least one second fastener 38. In this embodiment, the bicycle rear sprocket assembly 10 further comprises a plurality of additional fastening members 38. The sprocket SP4 is coupled to the sprocket carrier 12 with the plurality of additional fastening members 38.

The bicycle rear sprocket assembly 10 further comprises at least one additional fastening member 40. In this embodiment, the bicycle rear sprocket assembly 10 further comprises a plurality of additional fastening members 40. The sprocket SP5 is coupled to the sprocket carrier 12 with the plurality of additional fastening members 40.

The bicycle rear sprocket assembly 10 further comprises at least one additional fastening member 42. In this embodiment, the bicycle rear sprocket assembly 10 further comprises a plurality of additional fastening members 42. The sprocket SP6 is coupled to the sprocket carrier 12 with the plurality of additional fastening members 42.

The bicycle rear sprocket assembly 10 further comprises at least one additional fastening member 44. In this embodiment, the bicycle rear sprocket assembly 10 further comprises a plurality of additional fastening members 44. The sprocket SP7 is coupled to the sprocket carrier 12 with the plurality of additional fastening members 44.

In this embodiment, a total number of the fastening members 34 is 6. However, the total number of the fastening members 34 is not limited to this embodiment. The fastening member 34 is preferably made of a metallic material such as iron or titanium. The fastening member 34 can also be made of aluminum. However, the at least one fastening member 34 can be made of a non-metallic material. In this embodiment, the fastening member 34 includes a rivet. However, the fastening member 34 can include another fastener such as adhesive or diffusion bonding instead of or in addition to the rivet.

A total number of the fastening members 36 is 6. However, the total number of the fastening members 36 is not limited to this embodiment. The fastening member 36 is preferably made of a metallic material such as iron or titanium. The fastening member 36 can also be made of aluminum. However, the at least one fastening member 36 can be made of a non-metallic material. In this embodiment, the fastening member 36 includes a rivet. However, the fastening member 36 can include another fastener such as adhesive or diffusion bonding instead of or in addition to the rivet.

A total number of the additional fastening members 38 is 6. A total number of the additional fastening members 40 is 6. A total number of the additional fastening members 42 is 6. A total number of the additional fastening members 44 is 6. However, the total number of the additional fastening members is not limited to this embodiment. The material of the additional fastening member is the same as that of the material of the fastening member 34 and/or 36. Thus, they will not be described in detail here for the sake of brevity.

As seen in FIG. 17, the sprocket mounting portion 14A includes a mounting hole 20A provided on the radially extending surface 16A. The sprocket mounting portion 14B includes a mounting hole 20B provided on the radially extending surface 16B. The sprocket mounting portion 14C includes a mounting hole 20C provided on the radially extending surface 16C. The sprocket mounting portion 14D includes a mounting hole 20D provided on the radially extending surface 16D. The sprocket mounting portion 14E includes a mounting hole 20E provided on the radially extending surface 16E. As seen in FIG. 2, the fastening member 32 extends through the mounting hole 20A. The additional fastening member 38 extends through the mounting hole 20B. The additional fastening member 40 extends through the mounting hole 20C. The additional fastening member 42 extends through the mounting hole 20D. The additional fastening member 44 extends through the mounting hole 20E.

As seen in FIG. 3. the first sprocket SP1 has at least one circumferential coupling point CP1. The circumferential coupling point CP1 can also be referred to as a first circumferential coupling point CP1. Namely, the first sprocket wheel SP1 has at least one first circumferential coupling point CP1. In this embodiment, the at least one circumferential coupling point CP1 includes a plurality of circumferential coupling points CP1. The circumferential coupling points CP1 are spaced apart from each other in the circumferential direction D1. The circumferential coupling points CP1 are provided in the same radial position and are provided at a constant pitch in the circumferential direction D1. A total number of the circumferential coupling points CP1 is 6. However, the total number of the circumferential coupling points CP1 is not limited to this embodiment. The first sprocket SP1 includes a plurality of through-holes SP1D. The circumferential coupling point CP1 is defined at a center of the through-hole SP1D. As seen in FIG. 2, the fastening member 32 extends through the through-hole SP1D and the mounting hole 20A.

As seen in FIG. 18, the first sprocket SP1 is coupled to the radially extending surface 16 (FIG. 16) of at least one of the plurality of sprocket mounting portions 14A to 14E at the at least one circumferential coupling point CP1. In this embodiment, the first sprocket SP1 is coupled to the plurality of radially extending surfaces 16 (FIG. 16) of the plurality of sprocket mounting portions 14A at the plurality of circumferential coupling points CP1. The first sprocket SP1 is coupled to the radially extending surface 16 (FIG. 16) of the at least one of the plurality of sprocket mounting portions 14A to 14E at the at least one circumferential coupling point CP1 with the at least one fastening member 32. The first sprocket SP1 is coupled to the radially extending surface 16 of the at least one of the plurality of sprocket mounting portions 14A to 14E at the plurality of circumferential coupling points CP1 with the plurality of fastening members 32. In other words, the first sprocket wheel SP1 is coupled to the first circumferential sprocket-mounting portion 19A at the at least one first circumferential coupling point CP1. The first sprocket wheel SP1 is coupled to the first circumferential sprocket-mounting portion 19A at the at least one first circumferential coupling point CP1 with the at least one first fastener 32. The circumferential coupling point CP1 can be defined by the fastening member (the fastener) 32.

As seen in FIG. 4, the second sprocket SP2 has at least one additional circumferential coupling point CP2. The additional circumferential coupling point CP2 can also be referred to as a third circumferential coupling point CP2. Namely, the third sprocket wheel SP2 has at least one third circumferential coupling point CP2. In this embodiment, the at least one additional circumferential coupling point CP2 includes a plurality of additional circumferential coupling points (a plurality of third circumferential coupling points) CP2. The additional circumferential coupling points CP2 are spaced apart from each other in the circumferential direction D1. The additional circumferential coupling points CP2 are provided in the same radial position and are provided at a constant pitch in the circumferential direction D1. A total number of the additional circumferential coupling points CP2 is 12. However, the total number of the additional circumferential coupling points CP2 is not limited to this embodiment. The second sprocket SP2 includes a plurality of through-holes SP2D. The additional circumferential coupling point CP2 is defined at a center of the through-hole SP2D.

As seen in FIG. 3, the first sprocket SP1 includes a plurality of additional through-holes SP1E. The additional circumferential coupling point CP2 is defined at a center of the additional through-hole SP1E. The additional through-holes SP1E of the first sprocket SP1 are provided at positions corresponding to the through-holes SP2D (FIG. 4) of the second sprocket SP2.

Figure 19:
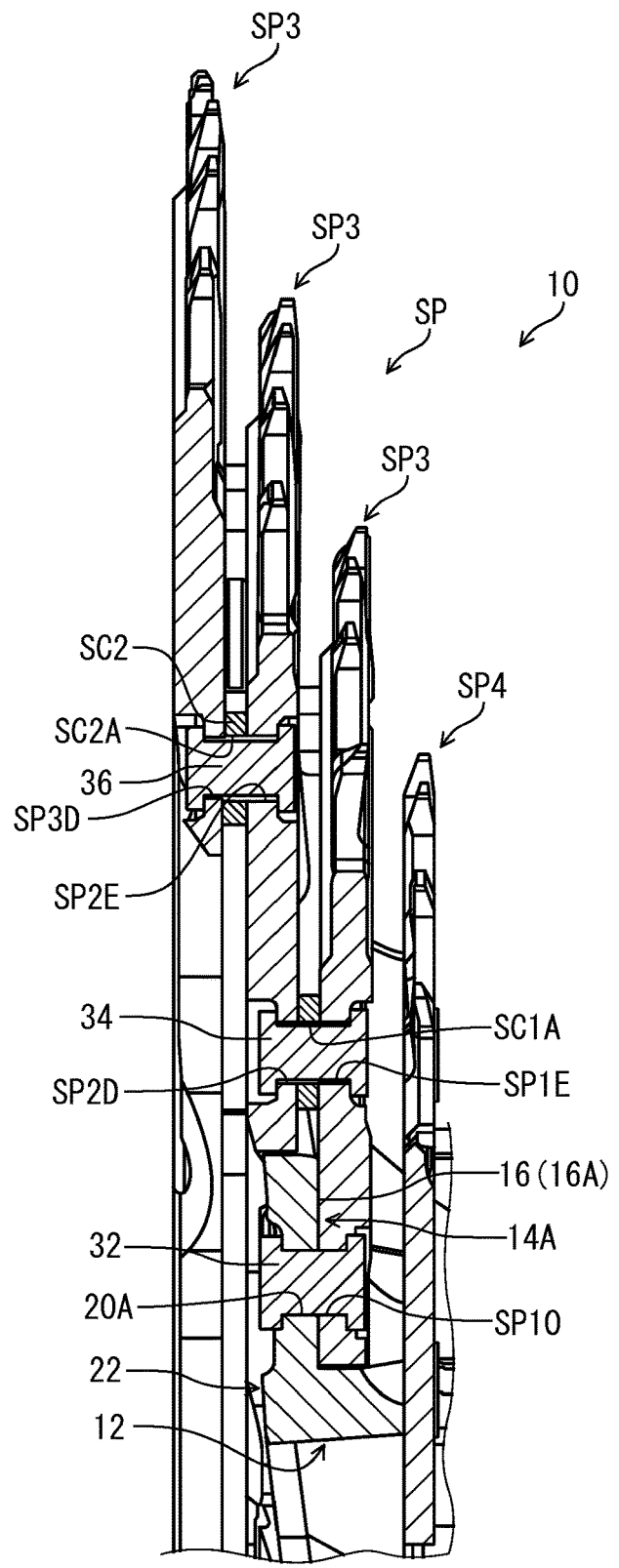
FIG. 19 is a cross-sectional view of the bicycle rear sprocket assembly taken along line XIX-XIX of FIG. 18.

As seen in FIG. 19, the bicycle rear sprocket assembly 10 comprises a plurality of spacers SC1 provided between the sprockets SP1 and SP2 in the axial direction D2. The spacer SC1 includes a spacer hole SC1A. The fastening member 34 extends through the additional through-hole SP1E, the through-holes SP2D, and the spacer hole SC1A. The spacer SC1 can be integrally formed with the fastening member 34 as a unitary, one-piece member.

As seen in FIG. 18, the second sprocket SP2 is coupled, at the at least one additional circumferential coupling point CP2, to at least one of the sprocket carrier 12 and one of the plurality of sprockets SP1 to SP12. In this embodiment, the second sprocket SP2 is coupled to the one of the plurality of sprockets SP1 to SP12 at the at least one additional circumferential coupling point CP2. In this embodiment, the second sprocket SP2 is coupled to the first sprocket SP1 at the at least one additional circumferential coupling point CP2. In other words, the third sprocket wheel SP2 is coupled to the first sprocket wheel SP1 at the at least one third circumferential coupling point CP2. However, the second sprocket SP2 can be coupled to the one of the plurality of sprockets at another coupling point. The second sprocket SP2 can be coupled to the sprocket carrier 12.

The second sprocket SP2 is coupled to the one of the plurality of sprockets SP1 to SP12 at the at least one additional circumferential coupling point CP2 with the at least one fastening member 34. The second sprocket SP2 is coupled to the first sprocket SP1 at the at least one additional circumferential coupling point CP2 with the at least one fastening member 34. The second sprocket SP2 is coupled to the one of the plurality of sprockets at the plurality of additional circumferential coupling points with the plurality of fastening members 34. The second sprocket SP2 is coupled to the first sprocket SP1 at the plurality of additional circumferential coupling points CP2 with the plurality of fastening members 34. The additional circumferential coupling point CP2 can be defined by the fastening member 34.

As seen in FIG. 18, a total number of the at least one circumferential coupling point (the at least one first circumferential coupling point) CP1 is different from a total number of the at least one additional circumferential coupling point (the at least one third circumferential coupling point) CP2. In this embodiment, the total number of the at least one additional circumferential coupling point (the at least one third circumferential coupling point) CP2 is larger than the total number of the at least one circumferential coupling point (the at least one first circumferential coupling point) CP1. The total number of the circumferential coupling points CP1 is 6. The total number of the additional circumferential coupling points CP2 is 12. The total number of the at least one additional circumferential coupling point (the at least one third circumferential coupling point) CP2 is double of the total number of the at least one circumferential coupling point (the at least one first circumferential coupling point) CP1. The total number of the at least one third circumferential coupling point CP2 is double of the total number of the at least one first circumferential coupling point CP1.

However, the relationship between the total number of the at least one circumferential coupling point CP1 and the total number of the at least one additional circumferential coupling point CP2 is not limited to this embodiment. The total number of the at least one circumferential coupling point CP1 can be equal to or larger than the total number of the at least one additional circumferential coupling point CP2. The total number of the circumferential coupling points CP1 is not limited to this embodiment. The total number of the additional circumferential coupling points CP2 is not limited to this embodiment.

The total number of the plurality of additional circumferential coupling points CP2 is larger than a total number of the plurality of sprocket mounting portions 14A. The total number of the plurality of additional circumferential coupling points CP2 is larger than a total number of the plurality of sprocket mounting arms 22. However, the total number of the plurality of additional circumferential coupling points CP2 can be equal to or smaller than the total number of the plurality of sprocket mounting portions 14A. The total number of the plurality of additional circumferential coupling points CP2 can be equal to or smaller than the total number of the plurality of sprocket mounting arms 22.

As seen in FIG. 5, the third sprocket SP3 has at least one additional circumferential coupling point CP3. In this embodiment, the at least one additional circumferential coupling point CP3 includes a plurality of additional circumferential coupling points CP3. The additional circumferential coupling points CP3 are spaced apart from each other in the circumferential direction D1. The additional circumferential coupling points CP3 are provided in the same radial position and are provided at a constant pitch in the circumferential direction D1. A total number of the additional circumferential coupling points CP3 is 12. However, the total number of the additional circumferential coupling points CP3 is not limited to this embodiment. The third sprocket SP3 includes a plurality of through-holes SP3D. The additional circumferential coupling point CP3 is defined at a center of the through-hole SP3D.

As seen in FIG. 4, the second sprocket SP2 includes a plurality of additional through-holes SP2E. The additional circumferential coupling point CP3 is defined at a center of the additional through-hole SP2E. The additional through-holes SP2E of the second sprocket SP2 are provided at positions corresponding to the through-holes SP3D (FIG. 4) of the third sprocket SP3.

As seen in FIG. 19, the bicycle rear sprocket assembly 10 comprises a plurality of spacers SC2 provided between the sprockets SP2 and SP3 in the axial direction D2. The spacer SC2 includes a spacer hole SC2A. The fastening member 36 extends through the additional through-hole SP2E, the through-holes SP3D, and the spacer hole SC2A. The spacer SC2 can be integrally formed with the fastening member 36 as a unitary, one-piece member.

As seen in FIG. 18, the third sprocket SP3 is coupled, at the at least one additional circumferential coupling point CP3, to at least one of the sprocket carrier 12 and one of the plurality of sprockets SP1 to SP12. In this embodiment, the third sprocket SP3 is coupled to the one of the plurality of sprockets SP1 to SP12 at the at least one additional circumferential coupling point CP3. In this embodiment, the third sprocket SP3 is coupled to the second sprocket SP2 at the at least one additional circumferential coupling point CP3. However, the third sprocket SP3 can be coupled to the one of the plurality of sprockets at another coupling point. The third sprocket SP3 can be coupled to the sprocket carrier 12.

The third sprocket SP3 is coupled to the one of the plurality of sprockets SP1 to SP12 at the at least one additional circumferential coupling point CP3 with the at least one additional fastening member 36. The third sprocket SP3 is coupled to the second sprocket SP2 at the at least one additional circumferential coupling point CP3 with the at least one additional fastening member 36. The third sprocket SP3 is coupled to the one of the plurality of sprockets at the plurality of additional circumferential coupling points with the plurality of additional fastening members 36. The third sprocket SP3 is coupled to the second sprocket SP2 at the plurality of additional circumferential coupling points CP3 with the plurality of additional fastening members 36. In other words, the fourth sprocket wheel SP3 is configured to be mounted to the third sprocket wheel SP2 with the at least one additional fastener 36. The fourth sprocket wheel SP3 is configured to be mounted to the third sprocket wheel SP2 with the plurality of additional fasteners 36. The additional circumferential coupling point CP3 can be defined by the additional fastening member (the additional fastener) 36.

As seen in FIG. 18, a total number of the at least one circumferential coupling point CP1 is different from a total number of the at least one additional circumferential coupling point CP3. In this embodiment, the total number of the at least one circumferential coupling point CP1 is smaller than the total number of the at least one additional circumferential coupling point CP3. The total number of the circumferential coupling points CP1 is 6. The total number of the additional circumferential coupling points CP3 is 12. The total number of the at least one additional circumferential coupling point CP3 is double of the total number of the at least one circumferential coupling point CP1. However, the relationship between the total number of the at least one circumferential coupling point CP1 and the total number of the at least one additional circumferential coupling point CP3 is not limited to this embodiment. The total number of the at least one circumferential coupling point CP1 can be equal to or larger than the total number of the at least one additional circumferential coupling point CP3. The total number of the circumferential coupling points CP1 is not limited to this embodiment. The total number of the additional circumferential coupling points CP3 is not limited to this embodiment.

The total number of the plurality of additional circumferential coupling points CP3 is larger than a total number of the plurality of sprocket mounting portions 14A. The total number of the plurality of additional circumferential coupling points CP3 is larger than a total number of the plurality of sprocket mounting arms 22. However, the total number of the plurality of additional circumferential coupling points CP3 can be equal to or smaller than the total number of the plurality of sprocket mounting portions 14A. The total number of the plurality of additional circumferential coupling points CP3 can be equal to or smaller than the total number of the plurality of sprocket mounting arms 22.

As seen in FIG. 6. the fourth sprocket SP4 has at least one second circumferential coupling point CP4. Namely, the second sprocket wheel SP4 has at least one second circumferential coupling point CP4. In this embodiment, the second sprocket wheel SP4 includes a plurality of second circumferential coupling points CP4. The second circumferential coupling points CP4 are spaced apart from each other in the circumferential direction D1. The second circumferential coupling points CP4 are provided in the same radial position and are provided at a constant pitch in the circumferential direction D1. A total number of the second circumferential coupling points CP4 is 6. However, the total number of the second circumferential coupling points CP4 is not limited to this embodiment. The second sprocket wheel SP4 includes a plurality of through-holes SP4D. The second circumferential coupling point CP4 is defined at a center of the through-hole SP4D. As seen in FIG. 2, the additional fastening member 38 extends through the through-hole SP4D and the mounting hole 20B.

As seen in FIG. 18, the second sprocket wheel SP4 is coupled to the radially extending surface 16 (FIG. 16) of at least one of the plurality of sprocket mounting portions 14A to 14E at the at least one second circumferential coupling point CP4. In this embodiment, the second sprocket wheel SP4 is coupled to the plurality of radially extending surfaces 16B (FIG. 16) of the plurality of sprocket mounting portions 14B at the plurality of second circumferential coupling points CP4. The second sprocket wheel SP4 is coupled to the radially extending surfaces 16B (FIG. 16) of the sprocket mounting portions 14B at the plurality of second circumferential coupling points CP4 with the plurality of additional fastening members 38. In other words, the second sprocket wheel SP4 is coupled to the second circumferential sprocket-mounting portion 19B at the at least one second circumferential coupling point CP4. The second sprocket wheel SP4 is coupled to the second circumferential sprocket-mounting portion 19B at the at least one second circumferential coupling point CP4 with the at least one second fastener 38. The second sprocket wheel SP4 is coupled to the second circumferential sprocket-mounting portion 19B at the plurality of second circumferential coupling points CP4 with the plurality of second fasteners 38. The additional circumferential coupling point (the second circumferential coupling point) CP4 can be defined by the second fastener 38.

A total number of the at least one second circumferential coupling point CP4 is equal to or larger than a total number of the at least one first circumferential coupling point CP1. In this embodiment, the total number of the at least one second circumferential coupling point CP4 is equal to the total number of the at least one first circumferential coupling point CP1. However, the total number of the at least one second circumferential coupling point CP4 can be smaller or larger than the total number of the at least one first circumferential coupling point CP1.

The second circumferential coupling point CP4 is provided radially inwardly of the circumferential coupling point CP1, the additional circumferential coupling point CP2, and the additional circumferential coupling point CP3. The additional circumferential coupling point CP2 and the additional circumferential coupling point CP3 are radially outwardly of the circumferential coupling point CP1. The additional circumferential coupling point CP3 is radially outwardly of the circumferential coupling point CP1 and the additional circumferential coupling point CP2. The additional circumferential coupling point CP2 and the additional circumferential coupling point CP3 are offset from the circumferential coupling point CP1 and the second circumferential coupling point CP4 in the circumferential direction D1. The additional circumferential coupling point CP2 is offset from the additional circumferential coupling point CP3 in the circumferential direction D1. However, the arrangement of the circumferential coupling point CP1, the additional circumferential coupling point CP2, the additional circumferential coupling point CP3, and the second circumferential coupling point CP4 is not limited to this embodiment.

As seen in FIG. 7, the sprocket SP5 includes a plurality of through-holes SP5D. A total number of the through-holes SP5D is 6. However, the total number of the through-holes SP5D is not limited to this embodiment. As seen in FIG. 2, the additional fastening member 40 extends through the through-hole SP5D and the mounting hole 20C.

As seen in FIG. 8, the sprocket SP6 includes a plurality of through-holes SP6D. A total number of the through-holes SP6D is 6. However, the total number of the through-holes SP6D is not limited to this embodiment. As seen in FIG. 2, the additional fastening member 42 extends through the through-hole SP6D and the mounting hole 20D.

As seen in FIG. 9, the sprocket SP7 includes a plurality of through-holes SP7D. A total number of the through-holes SP7D is 6. However, the total number of the through-holes SP7D is not limited to this embodiment. As seen in FIG. 10, the sprocket SP8 includes a plurality of through-holes SP8D. The through-holes SP8D are provided at positions corresponding to the through-holes SP7D. A total number of the through-holes SP8D is 6. However, the total number of the through-holes SP8D is not limited to this embodiment.

As seen in FIG. 2, the sprockets SP7 and SP8 are coupled to the sprocket mounting portion 14E with the additional fastening member 42. The bicycle rear sprocket assembly 10 comprises a plurality of spacers SC3 provided between the sprockets SP7 and SP8 in the axial direction D2. The spacer SC3 includes a spacer hole SC3A. The additional fastening member 42 extends through the through-hole SP7D, the through-hole SP8D, the mounting hole 20E, and the spacer hole SC3A. The spacer SC3 can be integrally formed with the additional fastening member 44 as a unitary, one-piece member.

As seen in FIG. 11, the sprocket SP9 includes an internal spline SP9S. The internal spline SP9S includes a plurality of internal spline teeth SP9T configured to engage with the plurality of external spline teeth (not shown) of the bicycle rear hub assembly H (FIG. 2). As seen in FIG. 2, the sprocket SP9 is held between the central portion 21 of the sprocket carrier 12 and the lock member H1 of the bicycle rear hub assembly H in the axial direction D2 in a state where the bicycle rear sprocket assembly 10 is mounted on the bicycle rear hub assembly H.

As seen in FIG. 12, the sprocket SP10 includes an internal spline SP10S. The internal spline SP10S includes a plurality of internal spline teeth SP10T configured to engage with the plurality of external spline teeth (not shown) of the bicycle rear hub assembly H (FIG. 2). As seen in FIG. 2, the sprocket SP10 is held between the central portion 21 of the sprocket carrier 12 and the lock member H1 of the bicycle rear hub assembly H in the axial direction D2 in a state where the bicycle rear sprocket assembly 10 is mounted on the bicycle rear hub assembly H.

Figure 20:
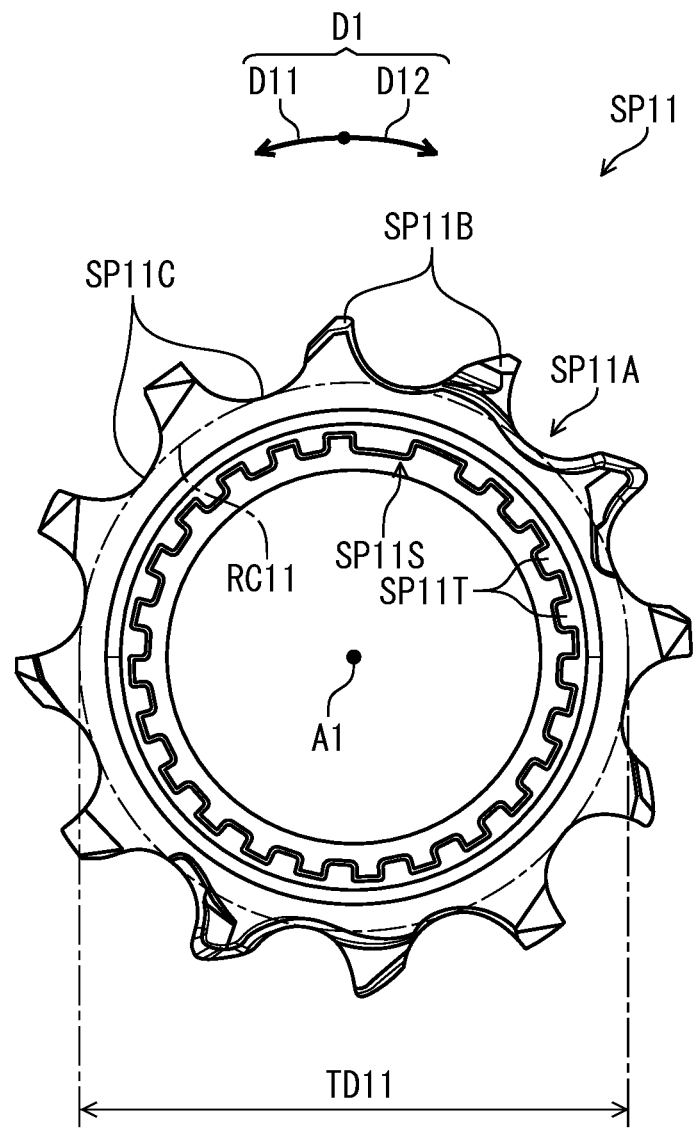
FIG. 20 is another side elevational view of the sprocket illustrated in FIG. 13.

As seen in FIG. 20, the sprocket SP11 includes an internal spline SP11S. The internal spline SP11S includes a plurality of internal spline teeth SP11T configured to engage with the plurality of external spline teeth (not shown) of the bicycle rear hub assembly H (FIG. 2). As seen in FIG. 2, the sprocket SP11 is held between the central portion 21 of the sprocket carrier 12 and the lock member H1 of the bicycle rear hub assembly H in the axial direction D2 in a state where the bicycle rear sprocket assembly 10 is mounted on the bicycle rear hub assembly H.

Figure 21:
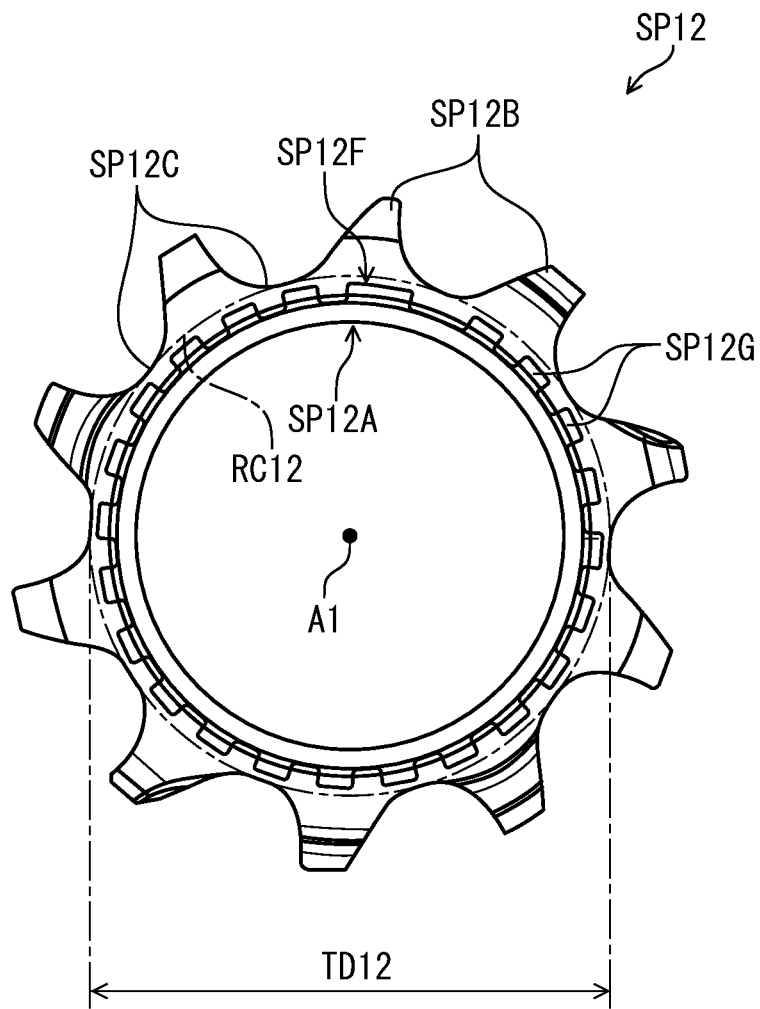
FIG. 21 is another side elevational view of the sprocket illustrated in FIG. 14.

As seen in FIG. 21, the sprocket SP12 includes a torque transmitting profile SP12F. The torque transmitting profile SP12F includes a plurality of external spline teeth SP12G configured to engage with the sprocket SP11 to transmit a rotational force. As seen in FIG. 13, the sprocket SP11 includes a torque transmitting profile SP11F. The torque transmitting profile SP11F includes a plurality of additional internal spline teeth SP11G configured to engage with the plurality of external spline teeth SP12G of the sprocket SP12 to transmit the rotational force.

Second Embodiment

A bicycle rear sprocket assembly 210 in accordance with a second embodiment will be described below referring to FIGS. 22 to 24. The bicycle rear sprocket assembly 210 has the same structure and/or configuration as those of the bicycle rear sprocket assembly 10 except for the sprocket carrier 12. Thus, elements having substantially the same function as those in the first embodiment will be numbered the same here, and will not be described and/or illustrated again in detail here for the sake of brevity.

Figure 22:
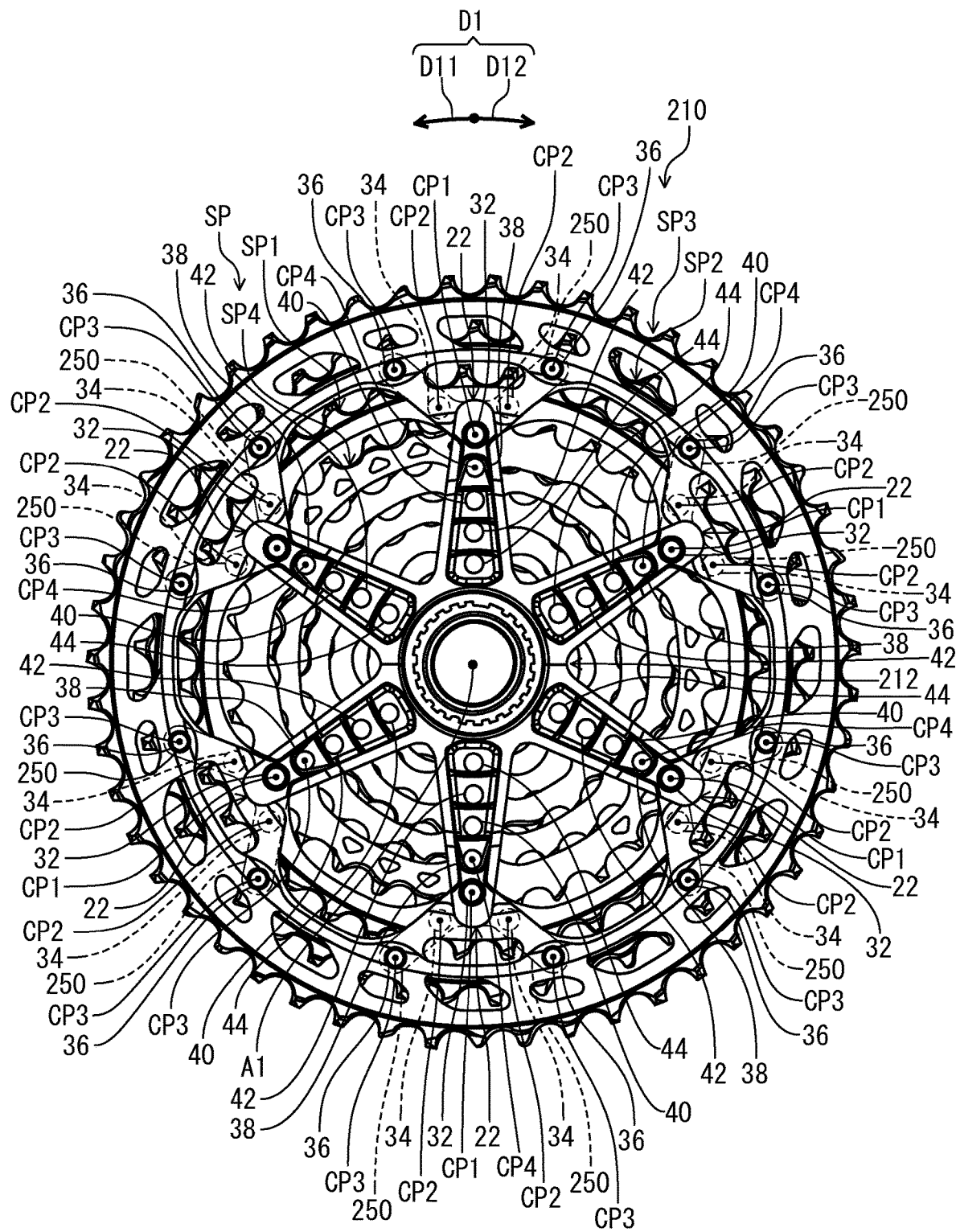
FIG. 22 is a side elevational view of a bicycle rear sprocket assembly in accordance with a second embodiment.

As seen in FIG. 22, the bicycle rear sprocket assembly 210 comprises the plurality of sprockets SP and a sprocket carrier 212. The second sprocket SP2 is coupled, at the at least one additional circumferential coupling point CP2, to at least one of the sprocket carrier 212 and one of the plurality of sprockets SP1 to SP12. In this embodiment, the second sprocket SP2 is coupled to the sprocket carrier 212 at the at least one additional circumferential coupling point CP2. The second sprocket SP2 is coupled to the sprocket carrier 212 at the plurality of additional circumferential coupling points CP2.

The bicycle rear sprocket assembly 210 further comprises the at least one fastening member 34. The second sprocket SP2 is coupled to the sprocket carrier 212 at the at least one additional circumferential coupling point CP2 with the at least one fastening member 34. In this embodiment, the bicycle rear sprocket assembly 210 further comprises the plurality of fastening members 34. The at least one additional circumferential coupling point CP2 includes the plurality of additional circumferential coupling points CP2. The second sprocket SP2 is coupled to the sprocket carrier 212 at the plurality of additional circumferential coupling points CP2 with the plurality of fastening members 34.

Figure 23:
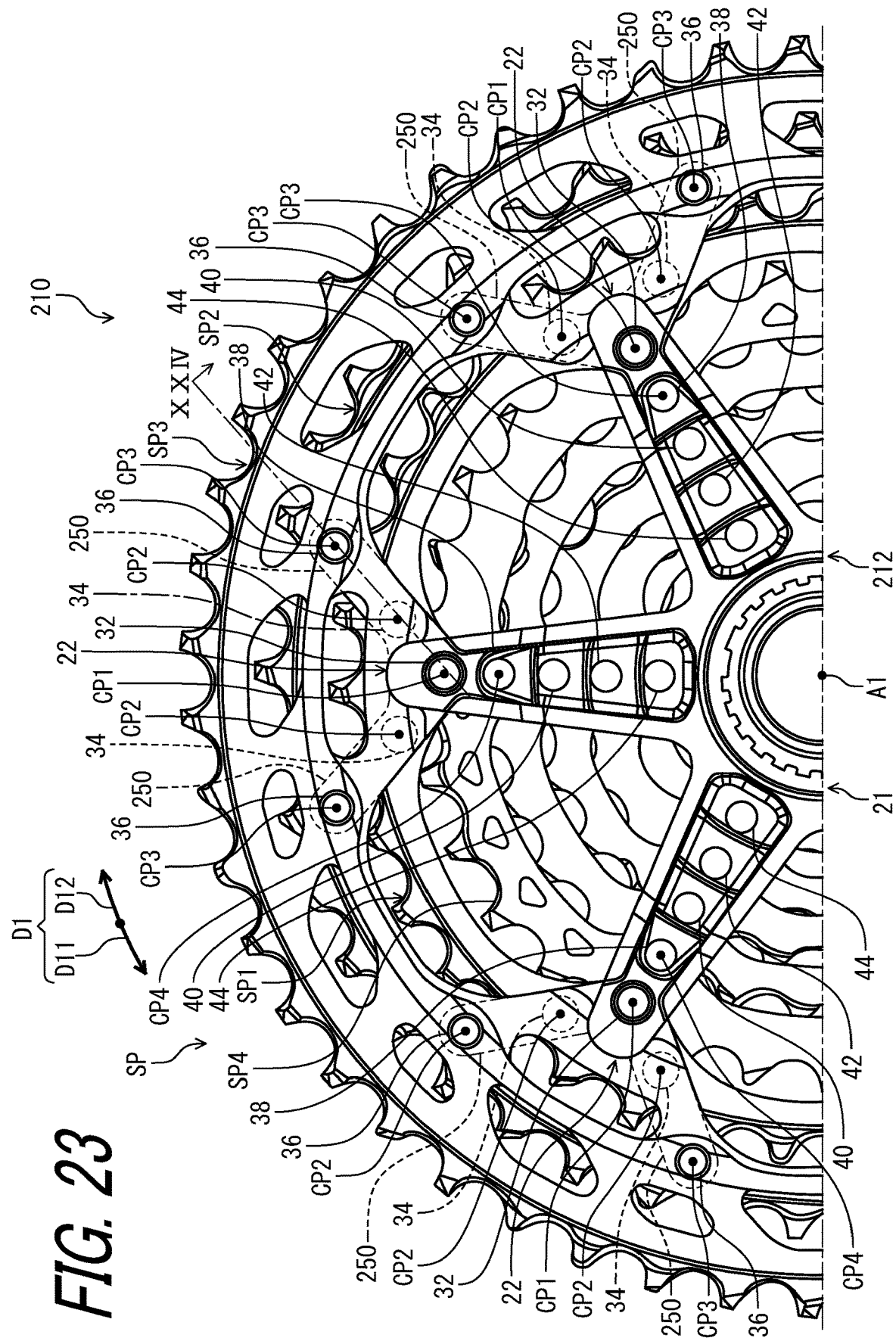
FIG. 23 is a partial side elevational view of the bicycle rear sprocket assembly illustrated in FIG. 22.

As seen in FIG. 23, the sprocket carrier 212 has substantially the same structure as that of the sprocket carrier 12 of the first embodiment. In this embodiment, the sprocket carrier 212 includes a plurality of additional sprocket mounting portions 250. A pair of the additional sprocket mounting portions 250 extend radially outwardly from the sprocket mounting arm 22. In this embodiment, a total number of the additional sprocket mounting portions 250 is 12. However, the total number of the additional sprocket mounting portions 250 is not limited to this embodiment. For example, the pair of the additional sprocket mounting portions 250 can be one sprocket mounting portion or at least three sprocket mounting portions. The arrangement of the circumferential coupling point CP1, the additional circumferential coupling point CP2, the additional circumferential coupling point CP3, and the second circumferential coupling point CP4 in the first embodiment can be applied to this embodiment.

Figure 24:
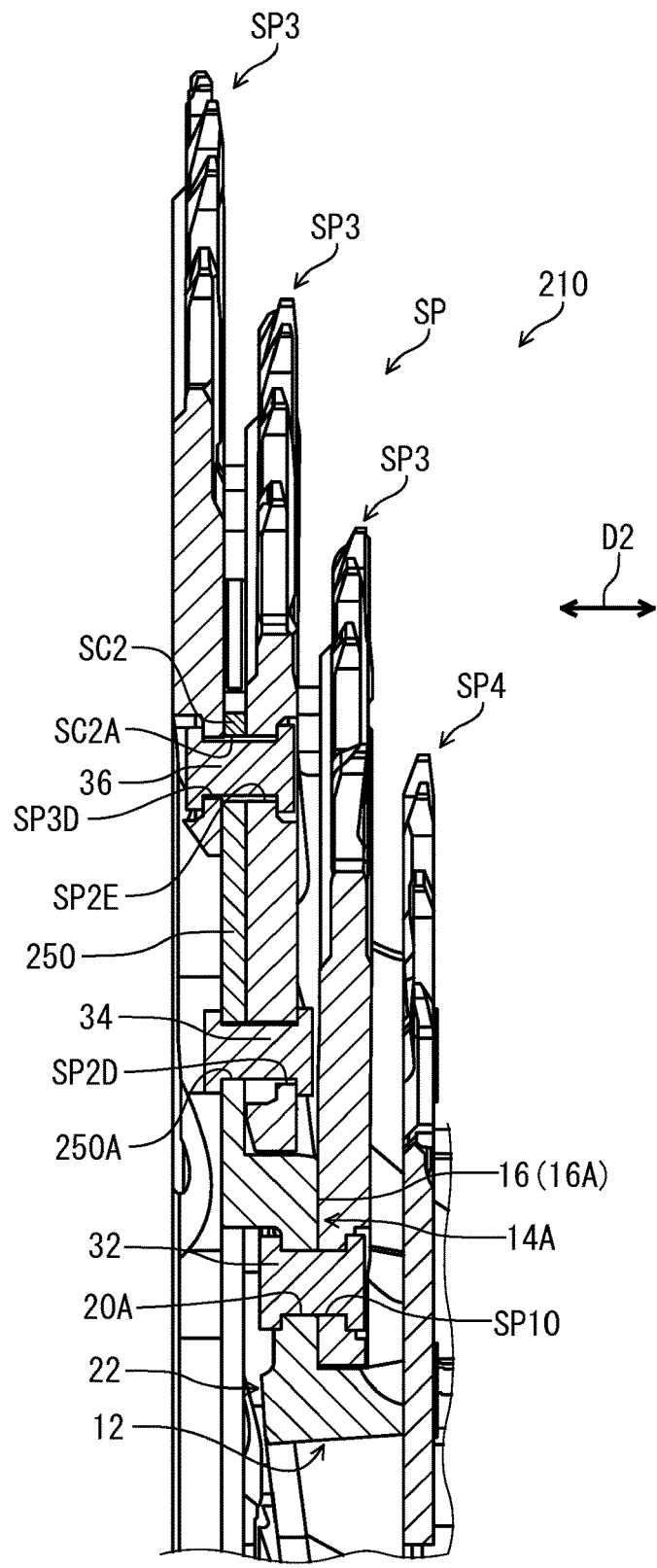
FIG. 24 is a cross-sectional view of the bicycle rear sprocket assembly taken along line XXIV-XXIV of FIG. 23.

As seen in FIG. 24, the additional sprocket mounting portion 250 is provided between the sprockets SP2 and SP3 in the axial direction D2. The additional through-holes SP1E are omitted from the first sprocket SP1. The spacers SC1 and SC2 are omitted from the bicycle rear sprocket assembly 210. The additional sprocket mounting portion 250 includes a mounting through-hole 250A and an additional mounting through-hole 250B. The fastening member 34 extends through the through-holes SP2D and the mounting through-hole 250A. The fastening member 36 extends through the additional through-hole SP2E, the through-holes SP3D, and the additional mounting through-hole 250B.

Modifications

Figure 25:
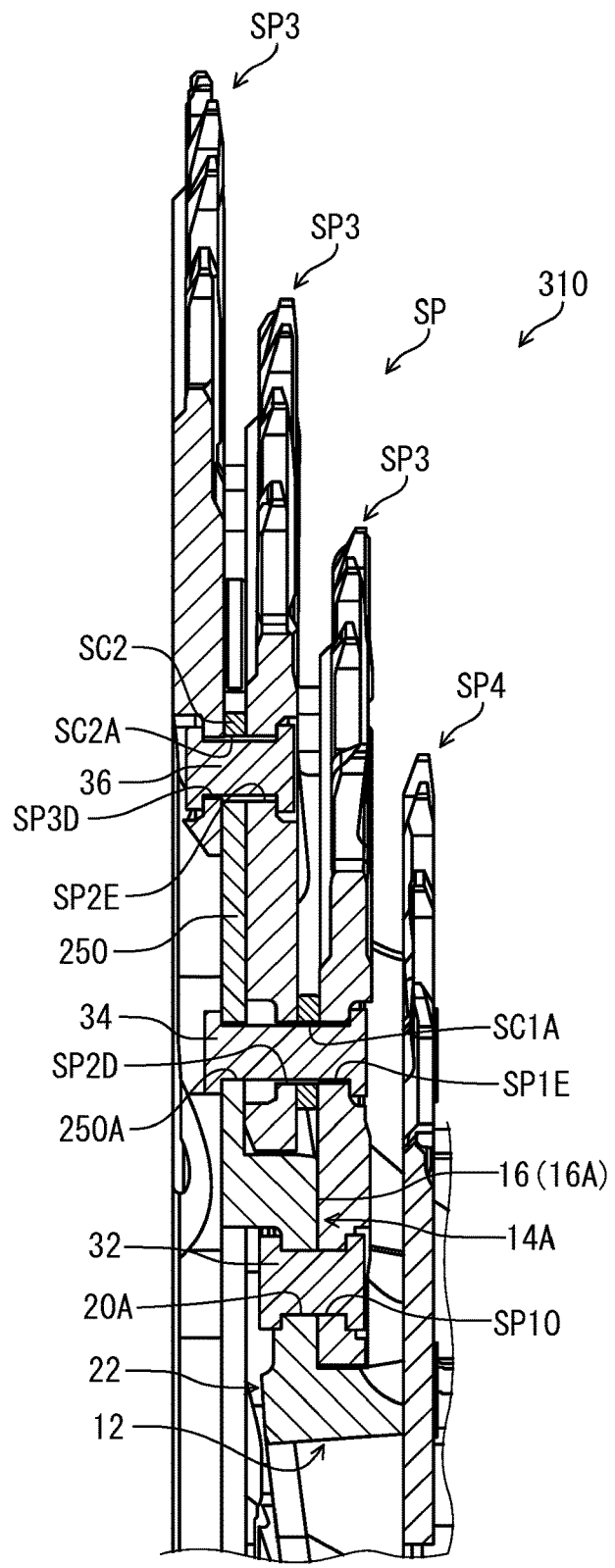
FIG. 25 is a cross-sectional view of a bicycle rear sprocket assembly in accordance with a modification.

The structures of bicycle rear sprocket assemblies 10 and 210 can be combined with each other. As seen in a bicycle rear sprocket assembly 310 of FIG. 25, for example, the second sprocket SP2 is coupled, at the at least one additional circumferential coupling point CP2, to both the sprocket carrier 212 and one of the plurality of sprockets SP1 to SP12. The second sprocket SP2 is coupled, at the plurality of additional circumferential coupling points CP2, to both the sprocket carrier 212 and the first sprocket SP1 with the plurality of fastening members 34.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly comprising:
a plurality of sprockets including a first sprocket and a second sprocket; and
a sprocket carrier including a plurality of sprocket mounting portions, at least one of the plurality of sprocket mounting portions having
a radially extending surface extending radially with respect to a rotational center axis of the bicycle rear sprocket assembly, and
an axially extending surface extending axially from the radially extending surface with respect to the rotational center axis,
the first sprocket having at least one circumferential coupling point, the first sprocket being coupled to the radially extending surface of at least one of the plurality of sprocket mounting portions at the at least one circumferential coupling point,
the second sprocket having at least one additional circumferential coupling point, the second sprocket being coupled, at the at least one additional circumferential coupling point, to at least one of the sprocket carrier and one of the plurality of sprockets, and
a total number of the at least one circumferential coupling point being different from a total number of the at least one additional circumferential coupling point.

2. The bicycle rear sprocket assembly according to claim 1, wherein
the total number of the at least one additional circumferential coupling point is larger than the total number of the at least one circumferential coupling point.

3. The bicycle rear sprocket assembly according to claim 2, wherein
the first sprocket has a maximum tooth bottom diameter, and
the second sprocket has an additional maximum tooth bottom diameter that is larger than the maximum tooth bottom diameter of the first sprocket.

4. The bicycle rear sprocket assembly according to claim 1, wherein
the plurality of sprocket mounting portions each has
the radially extending surface extending radially with respect to the rotational center axis, and
the axially extending surface extending axially from the radially extending surface with respect to the rotational center axis.

5. The bicycle rear sprocket assembly according to claim 1, further comprising
at least one fastening member, wherein
the first sprocket is coupled to the radially extending surface of the at least one of the plurality of sprocket mounting portions at the at least one circumferential coupling point with the at least one fastening member.

6. The bicycle rear sprocket assembly according to claim 1, further comprising
a plurality of fastening members, wherein
the at least one circumferential coupling point includes a plurality of circumferential coupling points, and
the first sprocket is coupled to the radially extending surface of the at least one of the plurality of sprocket mounting portions at the plurality of circumferential coupling points with the plurality of fastening members.

7. The bicycle rear sprocket assembly according to claim 1, wherein
the second sprocket is coupled to the one of the plurality of sprockets at the at least one additional circumferential coupling point.

8. The bicycle rear sprocket assembly according to claim 7, further comprising
at least one fastening member, wherein
the second sprocket is coupled to the one of the plurality of sprockets at the at least one additional circumferential coupling point with the at least one fastening member.

9. The bicycle rear sprocket assembly according to claim 7, further comprising
a plurality of fastening members, wherein
the at least one additional circumferential coupling point includes a plurality of additional circumferential coupling points, and the second sprocket is coupled to the one of the plurality of sprockets at the plurality of additional circumferential coupling points with the plurality of fastening members.

10. The bicycle rear sprocket assembly according to claim 1, wherein
the second sprocket is coupled to the sprocket carrier at the at least one additional circumferential coupling point.

11. The bicycle rear sprocket assembly according to claim 10, further comprising
at least one fastening member, wherein
the second sprocket is coupled to the sprocket carrier at the at least one additional circumferential coupling point with the at least one fastening member.

12. The bicycle rear sprocket assembly according to claim 10, further comprising
a plurality of fastening members, wherein
the at least one additional circumferential coupling point includes a plurality of additional circumferential coupling points, and
the second sprocket is coupled to the sprocket carrier at the plurality of additional circumferential coupling points with the plurality of fastening members.

13. The bicycle rear sprocket assembly according to claim 1, wherein
the sprocket carrier includes a central portion and a plurality of sprocket mounting arms extends radially outwardly from the central portion with respect to the rotational center axis,
the plurality of sprocket mounting portions is respectively provided to the plurality of sprocket mounting arms, and
the total number of the plurality of additional circumferential coupling points is larger than a total number of the plurality of sprocket mounting portions.

14. The bicycle rear sprocket assembly according to claim 13, wherein
the central portion of the sprocket carrier has a hub engagement profile.

15. The bicycle rear sprocket assembly according to claim 1, wherein
the plurality of sprockets further includes a third sprocket and a fourth sprocket.

16. The bicycle rear sprocket assembly according to claim 1, wherein
the first sprocket is made of titanium.

17. The bicycle rear sprocket assembly according to claim 3, wherein
the second sprocket is made of aluminum.

18. The bicycle rear sprocket assembly according to claim 1, wherein
the plurality of sprocket mounting portions is offset from each other in a radial direction with respect to the rotational center axis.

19. The bicycle rear sprocket assembly according to claim 1, wherein
the total number of the at least one additional circumferential coupling point is double of the total number of the at least one circumferential coupling point.

20. A bicycle rear sprocket assembly comprising:
a first sprocket wheel having a first maximum tooth bottom diameter;
a second sprocket wheel having a second maximum tooth bottom diameter that is smaller than the first maximum tooth bottom diameter of the first sprocket wheel;
a third sprocket wheel having a third maximum tooth bottom diameter that is larger than the first maximum tooth bottom diameter of the first sprocket wheel;
at least one fastener; and
a sprocket carrier including a central portion and a plurality of sprocket mounting arms extending radially outwardly from the central portion with respect to a rotational center axis of the bicycle rear sprocket assembly, the sprocket carrier including
a first circumferential sprocket-mounting portion provided to the plurality of sprocket mounting arms, and
a second circumferential sprocket-mounting portion provided to the plurality of sprocket mounting arms and disposed radially inwardly from the first circumferential sprocket-mounting portion with respect to the rotational center axis,
the first circumferential sprocket-mounting portion being configured to support the first sprocket wheel, the second circumferential sprocket-mounting portion being configured to support the second sprocket wheel, the third sprocket wheel being configured to be coupled to the first sprocket wheel with the at least one fastener, the first sprocket wheel being disposed between the second sprocket wheel and the third sprocket wheel in an axial direction with respect to the rotational center axis.

21. The bicycle rear sprocket assembly according to claim 20, wherein
the first circumferential sprocket-mounting portion has
a first radially extending surface extending radially with respect to the rotational center axis, and
a first axially extending surface extending axially with respect to the rotational center axis, and
the second circumferential sprocket-mounting portion has
a second radially extending surface extending radially with respect to the rotational center axis, and
a second axially extending surface extending axially with respect to the rotational center axis.

22. The bicycle rear sprocket assembly according to claim 20, further comprising:
at least one first fastener; and
at least one second fastener, wherein
the first sprocket wheel has at least one first circumferential coupling point and is coupled to the first circumferential sprocket-mounting portion at the at least one first circumferential coupling point with the at least one first fastener, and
the second sprocket wheel has at least one second circumferential coupling point and is coupled to the second circumferential sprocket-mounting portion at the at least one second circumferential coupling point with the at least one second fastener.

23. The bicycle rear sprocket assembly according to claim 20, further comprising:
at least one additional fastener; and
a fourth sprocket wheel configured to be mounted to the third sprocket wheel with the at least one additional fastener, the third sprocket wheel being disposed between the first sprocket wheel and the fourth sprocket wheel in the axial direction.

24. The bicycle rear sprocket assembly according to claim 20, wherein
the central portion of the sprocket carrier has a hub engagement profile.

25. The bicycle rear sprocket assembly according to claim 20, wherein the first sprocket wheel has at least one first circumferential coupling point and is coupled to the first circumferential sprocket-mounting portion at the at least one first circumferential coupling point, the second sprocket wheel has at least one second circumferential coupling point and is coupled to the second circumferential sprocket-mounting portion at the at least one second circumferential coupling point, a total number of the at least one second circumferential coupling point is equal to or larger than a total number of the at least one first circumferential coupling point, the third sprocket wheel has at least one third circumferential coupling point and is coupled to the first sprocket wheel at the at least one third circumferential coupling point, and a total number of the at least one third circumferential coupling point is larger than the total number of the at least one first circumferential coupling point.

26. The bicycle rear sprocket assembly according to claim 25, wherein the total number of the at least one third circumferential coupling point is double of the total number of the at least one first circumferential coupling point.

\* \* \* \* \*